US008437255B2

(12) United States Patent
Jiang

(10) Patent No.: US 8,437,255 B2
(45) Date of Patent: *May 7, 2013

(54) ESTIMATING WIRELESS PROCESSING DEVICE QUEUE LENGTH AND ESTIMATING SIGNAL RECEPTION QUALITY IN A WIRELESS NETWORK

(75) Inventor: Wenyu Jiang, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 181 days.

This patent is subject to a terminal disclaimer.

(21) Appl. No.: 12/984,766

(22) Filed: Jan. 5, 2011

(65) Prior Publication Data

US 2011/0096694 A1 Apr. 28, 2011

Related U.S. Application Data

(62) Division of application No. 12/226,239, filed as application No. PCT/US2007/008941 on Apr. 9, 2007, now Pat. No. 8,031,602.

(60) Provisional application No. 60/791,970, filed on Apr. 13, 2006.

(51) Int. Cl.
*H04L 12/26* (2006.01)
*H04L 12/56* (2006.01)

(52) U.S. Cl.
USPC .............................. 370/232; 370/252; 370/412

(58) Field of Classification Search ........................ None
See application file for complete search history.

(56) References Cited

U.S. PATENT DOCUMENTS

| 5,440,691 | A   | * | 8/1995  | Carrafiello et al. | 709/234 |
| 6,252,851 | B1  | * | 6/2001  | Siu et al.         | 370/236 |
| 7,180,858 | B1  | * | 2/2007  | Roy et al.         | 370/232 |
| 7,349,419 | B1  | * | 3/2008  | Philp              | 370/414 |
| 7,447,977 | B2  | * | 11/2008 | Bauer et al.       | 714/774 |
| 7,707,478 | B2  | * | 4/2010  | Jiang              | 714/758 |
| 7,805,656 | B2  | * | 9/2010  | Jiang              | 714/758 |
| 8,031,602 | B2  | * | 10/2011 | Jiang              | 370/232 |
| 2006/0056346 | A1 | * | 3/2006  | Vadgama et al.    | 370/329 |
| 2006/0072694 | A1 | * | 4/2006  | Dai et al.        | 375/354 |

FOREIGN PATENT DOCUMENTS

| WO | 9904536    | 1/1999 |
| WO | 02075338   | 9/2002 |
| WO | 2005081465 | 9/2005 |

OTHER PUBLICATIONS

Kunniyur, et al., "End-to-End Congestion Control Schemes: Utility Functions, Random Losses and ECN Marks" IEEE/ACM Transactions on Networking, vol. II, No. 5, Oct. 2003, pp. 689-702.

Postel, J., "RFC 793-Transmission Control Protocol" Internet Engineering Task Force (IETF). Sep. 1981. 84 pages.

(Continued)

*Primary Examiner* — Clemence Han

(57) ABSTRACT

The present invention may be used to estimate operational characteristics of devices that transmit and receive streams of information in a communication system. In one application, the level of occupancy of a FIFO buffer in a processing device such as a router or wireless access point is estimated by monitoring packets transmitted by the processing device. Estimates of the operational characteristics can be used to control communications in the system so that the overall performance is improved. Techniques that can be used to mitigate effects of low signal-to-noise ratio conditions are also disclosed.

11 Claims, 5 Drawing Sheets

OTHER PUBLICATIONS

IEEE Wireless LAN Medium Access Control (MAC) and Physical Layer (PHY) Specifications, ANSI/IEEE, 1999 Edition, 512 pages.

IEEE Std 802,11e, "Wireless LAN Medium Access Control (MAC) and Physical Layer (PHY) Specifications Medium Access Control (MAC) Quality of Service Enhancements" Nov. 11, 2005, 189 pages.

* cited by examiner

_US 8,437,255 B2_

ESTIMATING WIRELESS PROCESSING DEVICE QUEUE LENGTH AND ESTIMATING SIGNAL RECEPTION QUALITY IN A WIRELESS NETWORK

CROSS REFERENCE TO RELATED APPLICATION

This application is a divisional of U.S. patent application Ser. No. 12/226,239 filed on Mar. 18, 2009, now U.S. Pat. No. 8,031,602, which is a National Stage of PCT application PCT/US2007/008941 filed on Apr. 9, 2007, which is non-provisional of U.S. Provisional Application Ser. No. 60/791,970 filed on Apr. 13, 2006.

TECHNICAL FIELD

The present invention pertains generally to devices that transmit and receive streams of information and it pertains more specifically to techniques that may be used to determine operational characteristics of these devices by monitoring the streams of information. For example, the present invention may be used to determine operational characteristics of receivers, routers and access points in wireless networks that transmit and receive streams of multimedia information arranged in packets.

BACKGROUND ART

The delivery of real-time multimedia traffic over wireless networks is expected to be an important application in Third Generation Cellular, WiFi and WiMAX wireless networks. In these applications, streams of multimedia information such as digital data representing images and sounds are organized into packets. Multimedia sources send streams of these packets to processing devices such as routers or wireless access points that transmit the packets over communication channels to end-user receivers. If a processing device is unable to transmit a packet immediately, it temporarily stores the packet in a queue or buffer until it can be transmitted. For example, a wireless access point may not be able to transmit a packet when the wireless communication channel is being used by another processing device.

When a processing device such as a router receives information at a higher rate than it can transmit, the amount of information stored in the queue or buffer will increase. If the incoming rate remains higher than the outgoing rate for a long enough period of time, the level of occupancy for stored-information in the buffer will increase until it reaches a maximum level of occupancy that is dictated by the storage capacity of the buffer. During this condition, which is referred to as buffer overflow, information loss is inevitable because the processing device must either discard information as it arrives or it must discard information from the buffer to obtain space to store the arriving information. In typical wireless networks that conform to the IEEE 802.11a or 802.11g standards, for example, processing devices such as wireless access points and routers receive information from wired communication paths operating at rates up to 100 Mb/s and they forward or transmit that information over wireless communication paths that operate at rates no higher than 54 Mb/s. If the processing device receives information from the wired path at a rate near 100 Mb/s, for example, it cannot transmit information over the wireless path at a rate that is high enough to keep up with the rate the received information arrives. The level of buffer occupancy will increase until the demand for buffer storage exceeds the buffer capacity. Some information will be lost because it must be discarded before it can be forwarded or transmitted.

Information can also be lost because of noise or interference in the transmission channel. This type of loss is common in many wireless networks but it can be reduced through the use of re-transmission and forward-error correction (FEC) techniques. Unfortunately, these techniques increase the amount of data that must be transmitted, thereby decreasing the effective rate at which information can be transmitted by the processing devices and, as a result, impose a greater demand for buffer storage.

International patent application no. PCT/US2006/020861 entitled "Method and System for Optimizing Forward Error Correction of Multimedia Streaming over Wireless Networks" by Bauer and Jiang filed May 26, 2006, publication no. WO 2007/005160 published Jan. 11, 2007, describes techniques that may be used to select a pair of FEC parameters (n, k) for a packet-based network that minimize information loss caused by buffer overflow for a set of n packets, where k=a number of packets carrying multimedia data and (n−k)=a number of error-correcting packets in the set of n packets. (This application is referred to below as the "FEC Optimization Application" and its contents are incorporated herein by reference in their entirety.) These techniques require several input parameters including the maximum level of buffer occupancy, referred to here as the buffer size or buffer capacity, and the rate at which competing or interfering information arrives at the processing device. What is needed is a way to estimate these parameters without having a knowledge of and without having access to the internal operation of the processing device.

The loss of information caused by buffer overflow may be reduced or eliminated by use of another technique that controls the rate at which a source provides information to the processing device. What is needed is a way to implement this technique using a measure of the level of buffer occupancy that can be obtained without having a knowledge of or having access to the internal operation of the processing device.

DISCLOSURE OF INVENTION

It is an object of the present invention to provide for ways to determine operational characteristics of processing devices like routers and wireless access points by monitoring information transmitted by these devices. For example, operational characteristics such as buffer capacity and level of buffer occupancy can be determined. It is also an object of the invention to provide for ways to assess whether monitoring conditions like signal-to-noise ratios are sufficient to permit the operational characteristics to be determined with reasonable accuracy.

Various implementations of the present invention discussed below are able to estimate the capacity of a buffer in a processing device, are able to estimate the level of buffer occupancy in a processing device at particular point in time, and are able to measure the reliability of these estimates by monitoring information that is transmitted by the processing device. All of the implementations discussed below assume the processing device is a type of forwarding device such as a wireless access point that receives one or more streams of input information from a wired or optical path and that transmits one or more output streams of information over a wireless path, where the streams of input information and the streams of output information are arranged in discrete segments. Some of these implementations assume the buffer in the processing device implements a first-in-first-out (FIFO) queue for the segments of information.

The various features of the present invention and its preferred embodiments may be better understood by referring to the following discussion and the accompanying drawings. The contents of the following discussion and the drawings are set forth as examples only and should not be understood to represent limitations upon the scope of the present invention.

MODES FOR CARRYING OUT THE INVENTION

A. Introduction

Figure 1:
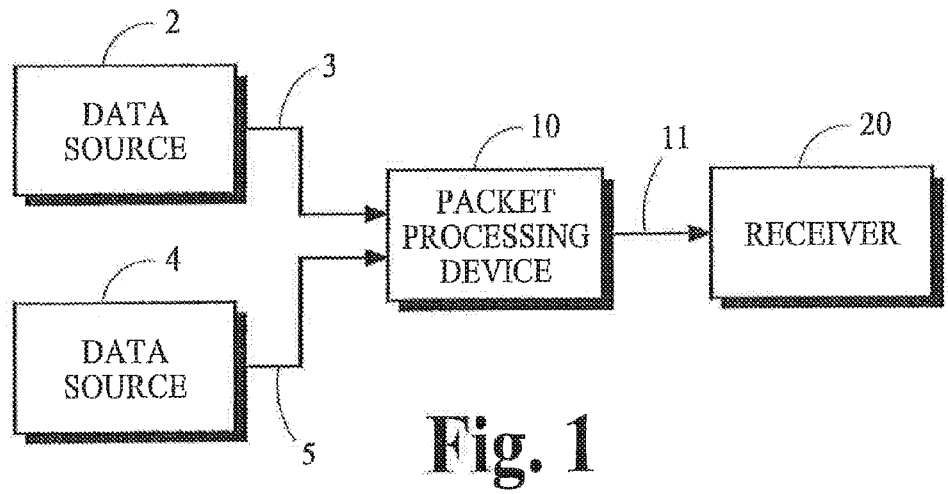
FIG. 1 is a schematic block diagram of a communication system.

FIG. 1 is a schematic illustration of a communication system in which one or more data sources 2, 4 provide source signals that convey information arranged in packets. The information carried in at least some of the packets may be multimedia information, for example. The source signal provided by the data source 2 conveys information arranged in "primary packets" that are associated with some application. Other data sources such as the data source 4 also provide source signals conveying information arranged in packets referred to as "competing packets" because these latter packets compete for resources needed to service the primary packets; however, the source signals from these other data sources need not carry the same type of information and the competing packets need not be arranged in the same manner as that described for the data source 2.

The source signals from the data sources 2, 4 are passed along the communication paths 3, 5, respectively, to the processing device 10. These communication paths 3, 5 may be implemented by a wide variety of communication technologies. For example, technologies using media such as metallic wires or optical fibers and conforming to any of the IEEE 802.3 standards may be used. The processing device 10, which may be a router or a wireless access point, for example, receives packets from each of the data sources 2, 4 and stores information for at least some of the packets in a buffer. The processing device 10 transmits packets of information along the communication path 11 for reception by one or more receivers such as the receiver 20. The communication path 11 may be implemented by a wide variety of technologies including wireless technologies such as those conforming to any of the IEEE 802.11 standards. The communication system may include other receivers, transmitters and data sources as desired.

The receiver 20 represents a device in which various aspects of the present invention may be performed. In implementations of the communication system such as those described below, the communications path 11 is a broadcast or multi-cast medium. The receiver 20 monitors the communications path 11 and analyzes the information that is transmitted by the processing device 10 using the techniques that are described below. Information that is destined for the receiver 20 as well as any other receiver is monitored and analyzed. The receiver 20 may also receive and process information that is intended for one or more other applications.

Devices in this communication system may incorporate a variety of error-correction or error-recovery techniques such as conventional forward-error-correction (FEC) processes or quality-of-service processes such as, for example, having either data sources or processing devices retransmit those packets that a receiver does not acknowledge receiving.

The schematic illustration shown in FIG. 1 omits a number of components that may be desirable in a practical implementation of a communication system but are not needed to explain the present invention. For example, the figure does not illustrate the components that would be needed to establish whether the communication path 11 is clear, that is, whether other packet processing devices are currently using the communication path 11 or whether some type of interference exists that is likely to prevent reception by the receiver 20. Also not shown are components that would be needed to obtain from the receiver 20 any information on packet losses or the need to retransmit packets.

Throughout the remainder of this disclosure, more particular mention will be made of implementations in which communication paths between the data sources and processing devices conform to one of the IEEE 802.3 standards and the communication paths between processing devices and receivers conform to one of the IEEE 802.11 standards. The streams of information that are conveyed along these communication paths are arranged according to a Medium Access Control (MAC) protocol, which arranges the information into MAC frames that include a packet of application data appended to a MAC header. The MAC header includes the network address of the source of the application data ("source address") and the network address of the intended recipient or recipients of the application data ("destination address"). These details of implementation are provided as examples. The present invention may be used with essentially any desired communication technology.

For technologies that conform to the IEEE 802.3 and IEEE 802.11 standards, it is technically accurate to say MAC frames conveying packets of information are transmitted and received; however, the following discussion is simplified somewhat by sometimes describing these types of activities as transmitting and receiving packets.

Some of the exemplary implementations discussed below use packets with time information, referred to as "probe packets," to measure signal propagation and processing delays. Unless otherwise noted, these exemplary implementations are based on an assumption that the signals conveying these probe packets propagate from their respective sources to the processing device 10 in an amount of time that is either negligible, is constant or is capable of being predicted by the receiver 20.

B. Estimating Buffer Occupancy

A few techniques are described below that may be used to estimate the current level of buffer occupancy in the processing device 10.

1. Basic Technique

One implementation of a buffer occupancy estimation technique uses a probe packet and is based on a few assumptions: (1) a data source sends a probe packet at time $t_S$ and it inserts the sending time $t_S$ into either the packet or control information that accompanies the probe packet, (2) the interval between the sending time $t_S$ and the arrival time at the processing device 10 is negligible, (3) the processing device 10 buffers and subsequently transmits the probe packet and its sending time in a form that can be observed by the receiver 20, (4) the data source of the probe packet and the receiver 20 use clocks that are synchronized with each other; (5) the processing device 10 uses its buffer to implement a first-in first-out (FIFO) queuing scheme, and (6) the level of buffer occupancy is measured in terms of the number of packets that have been stored in the buffer but not yet retrieved.

If the level of buffer occupancy is L at time $t_S$ when a probe packet arrives at the processing device 10, then the buffer at time $t_S$ will have L packets ahead of the probe packet in the FIFO queue. The processing device 10 will not transmit the probe packet until all L of the previous packets are transmitted. When the processing device 10 transmits the probe packet and that probe packet is observed by the receiver 20 at time $t_R$, the receiver 20 can determine the level of buffer occupancy in the processing device 10 that existed at time $t_S$ by counting the number of unique packets that are transmitted by the processing device 10 during the interval from $t_S$ to $t_R$.

If the receiver 20 calculates the total number of bytes for all of the unique packets that are transmitted during this interval, the level of buffer occupancy can be expressed in terms of bytes. If desired, the receiver 20 can also account for any propagation delays between the data source and the processing device 10.

2. Counting Packets

The receiver 20 must count all unique packets transmitted by the processing device 10 that it receives. It is not sufficient to count only those packets that are destined to the receiver 20 itself. It is possible that none of the packets will be destined to the receiver 20.

In many practical implementations, the processing device 10 will re-transmit a packet if its intended receiver does not receive it without errors. This technique is particularly useful if the transmission medium for the communication path 11 is subject to noise and other interference that can corrupt the packets of information. In implementations such as these, the receiver 20 must keep a record of all MAC frames that it receives so that it can determine which packets are transmitted by the processing device 10 and which packets are unique. This can be accomplished by using the cyclical redundancy code (CRC) in each MAC frame to detect errors and using a correction process such as forward error correction to correct as many data errors as possible, examining information in the MAC header to determine if the MAC frame was transmitted by the processing device 10, and keeping a record of other information in the frame that indicates whether the MAC frame represents a re-transmission of a packet.

Whether a MAC frame is transmitted by the processing device 10 can be determined by examining information in the MAC header known as the Direction-flag and the source address. Whether a MAC frame represents the re-transmission of a packet can be determined by examining other information in the MAC header known as the packet sequence field. If desired, a transmission-retry indicator known as the Retry_flag may also be used.

Figure 2:
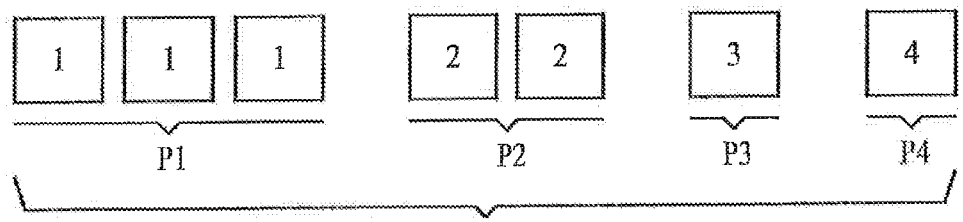
FIGS. 2 to 4 are schematic diagrams of packets with sequence numbers in a stream of frames.

Many protocols such as those that conform to the IEEE 802.11 standards use some means to identify each unique packet that is transmitted by the same device. The IEEE 802.11 standards specify a 12-bit field that conveys a monotonically increasing sequence number for each unique packet. The sequence number is incremented by one for each subsequent MAC frame that carries a unique packet. If two adjacent MAC frames transmitted by the same device have the same sequence number, the subsequent frame is deemed to represent a re-transmission of its packet. If two adjacent MAC frames have sequence numbers that differ by one, modulo $2^{12}$, where the earlier frame has the lower number, modulo $2^{12}$, then the two frames are deemed to convey unique successive packets in a stream of packets. Four unique packets P1, P2, P3, P4 with sequence numbers 1, 2, 3, 4 in a stream of frames is illustrated schematically in FIG. 2.

Figure 3:
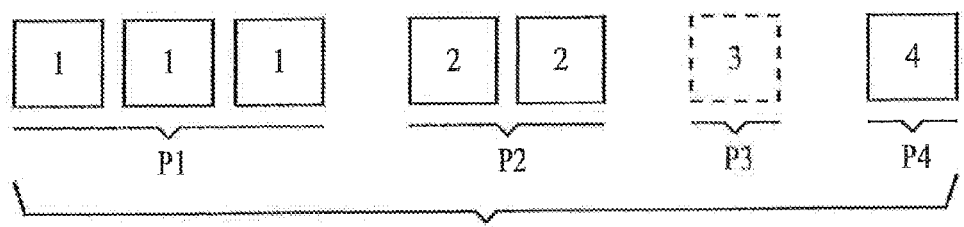

If the communications path 11 is a wireless communication path, a low signal-to-noise ratio or strong interfering signals may prevent the receiver 20 from recognizing some of the packets that are transmitted by the processing device 10. If the receiver 20 is the intended recipient, this loss can be recognized by the processing device 10 because the receiver 20 does not acknowledge successful receipt of the packet. The processing device 10 re-transmits the packet until successful receipt is acknowledged. If the receiver 20 is not the intended recipient, however, the loss would not be detected. This condition is illustrated schematically in FIG. 3, where the box with broken lines represents a frame with a packet P3 that is not observed by the receiver 20.

The receiver 20 also may fail to observe a packet for other reasons such as slow processing or defects in circuitry or programming that implement various features in the receiver 20. The reason for the loss is not critical to the present invention.

Errors in the count of packets that are caused by missing packets can be corrected by detecting gaps or jumps in the stream of sequence numbers and counting the number of unique packets that must be missing to cause the jump. For implementations that conform to one of the IEEE 802.11 standards, for example, this count $N_{MISSING}$ of missing packets can be calculated from the expression:

$$N_{MISSING} = Q_{STOP} - Q_{START} - 1 \tag{1}$$

where $Q_{START}$=sequence number in the frame immediately before the jump; and $Q_{STOP}$=sequence number in the frame immediately after the jump.

Empirical tests with various IEEE 802.11 wireless networks suggest that it is desirable to account for as many as four missing packets. If four or fewer packets are missing, a jump will occur in the stream of sequence number that is less than or equal to five, modulo $2^{12}$. In the example shown in FIG. 3, a jump in the stream of sequence numbers exists between frames with packets P2 and P4 having the sequence numbers 2 and 4. The size of the jump is 4−2=2, which indicates one packet is missing. The count of this one missing packet P3 can be included in the total count of packets observed by the receiver 20.

Figure 4:
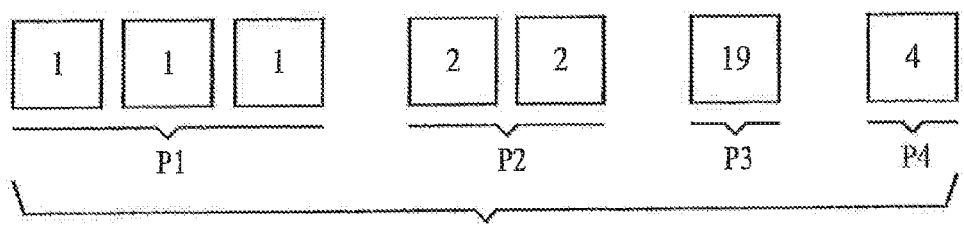

If a jump in the stream of sequence numbers is large, some other type of error may have occurred instead of or in addition to a failure to observe packets. For example, the sequence number in a received packet could have been corrupted in a way that could not be corrected. An example of this situation is illustrated schematically in FIG. 4, where the least significant bits for the sequence number of packet P3 (expressed as 00011 in binary) has been corrupted by an error in one bit to become 19 (expressed as 10011). The bit error creates a jump equal to 19−2=17. The number of packets that could account for such a large jump should not be counted because it is much more likely that the sequence number in one or more frames has been corrupted rather than a large number of packets were not observed. For the example shown in FIG. 4, a preferred implementation of the receiver 20 should count packet P3 with the apparent sequence number 19 as only one packet.

Large jumps in sequence numbers may be caused by at least two other reasons in addition to uncorrected bit errors in the sequence numbers. One reason is poor signal-reception quality such as that caused by an extremely low signal-to-noise ratio (SNR), which causes the receiver 20 to observe very few MAC frames. The large jumps are due to large numbers of missing packets. Some techniques discussed below may be used to determine if this condition exists. Another reason is that the processing device 10 may implement a queuing scheme that is not strictly FIFO because it reorders packets for transmission under certain conditions. Empirical tests have shown that some IEEE 802.11 compliant processing devices like routers or wireless access points may retrieve and transmit packets from their buffers in an order that is not strictly FIFO whenever the devices encounter a degradation in the quality of a wireless link to one of multiple receivers. If such a processing device does not receive an acknowledgement from an intended receiver that it has successfully received a particular packet P1 after several re-transmissions, the processing device may transmit another packet P2 that is destined to another receiver even though the P2 packet is behind the P1 packet in the queue. In effect, the packets in the queue are reordered, which introduces a jump in the sequence numbers for the stream of packets transmitted by the processing device. An estimation of the level of buffer occupancy becomes much more complicated when the queuing scheme departs from FIFO.

Fortunately, it is usually sufficient to account for missing packets only for small jumps in the stream of sequence numbers rather than attempt to determine the number of packets that account for large jumps in sequence numbers caused by bit errors, poor signal-reception quality or packet reordering.

Figure 5:
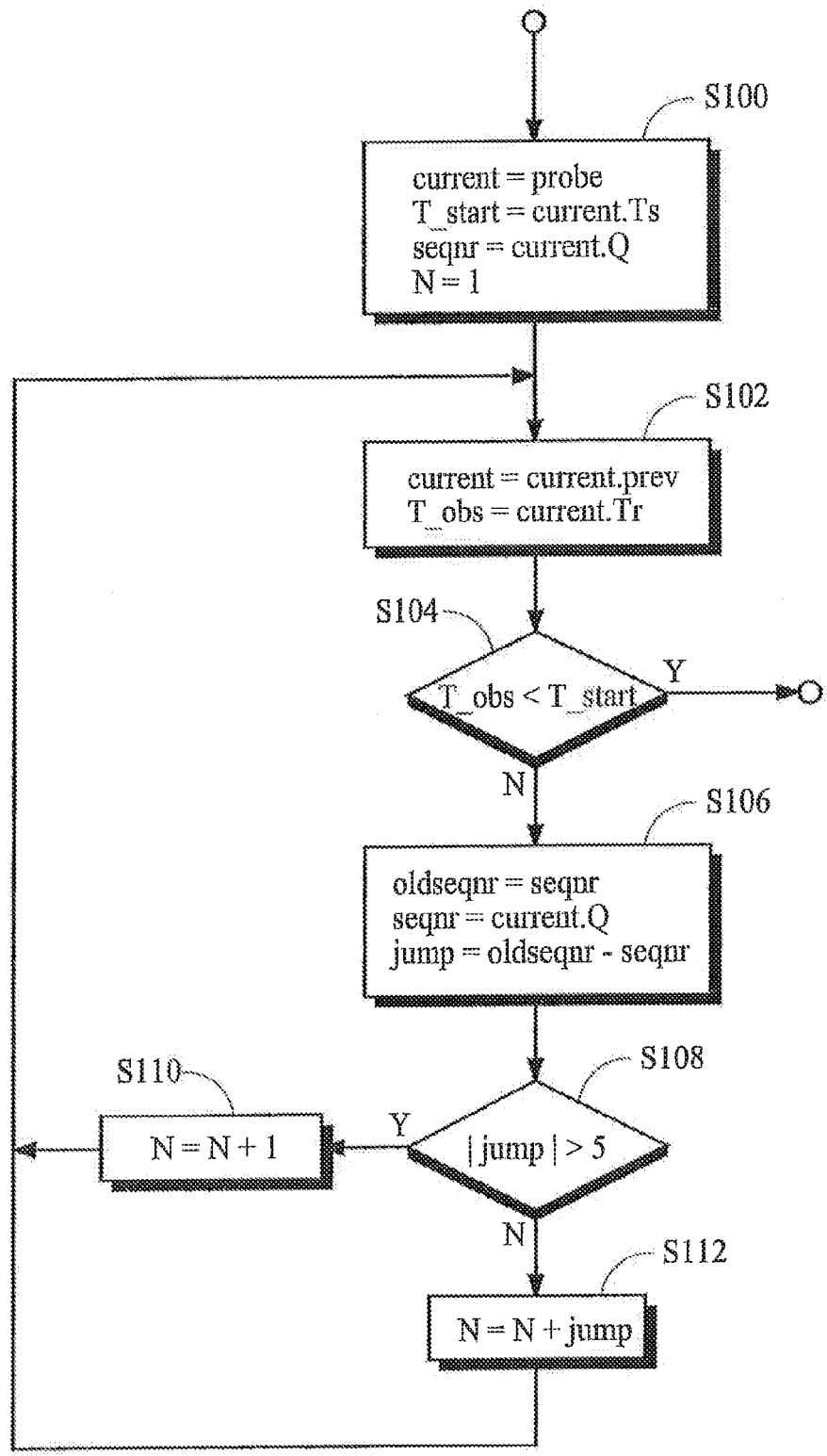
FIG. 5 is a flow diagram illustrating steps in a process that may be used to count the number of unique packets that were transmitted during a time interval.

The diagram shown in FIG. 5 represents one process that may be used to implement the techniques described above using information that is recorded for a stream of frames that are transmitted by the processing device 10. This information includes the sending time Ts for each probe packet when the probe packet was sent by its data source, which is assumed to be the arrival time at the processing device 10, the observation time Tr when each packet was observed by the receiver 20, and the sequence number Q for the frame that encapsulates each packet. Referring to the diagram shown in FIG. 5, step S100 establishes a "current frame" by initializing current to reference information recorded for the probe-packet frame, initializes the start time T_start from the sending time Ts of the probe packet in the current frame, initializes the value seqnr from the sequence number Q of the current frame, and initializes the packet count N to be equal to one. The observation time Tr for the probe-packet frame represents the ending time T_end of the time interval in which packets are to be counted. Step S102 establishes a new current frame by setting current to reference information recorded for the frame that is immediately previous to the current frame in the stream of frames, and sets the value T_obs from the observation time Tr of the new current frame. Step S104 determines whether the value T_obs precedes the start time T_start. If it does, the process concludes with the value N representing a count of packets in the time interval [T_start, T_end]. If the value T_obs does not precede the start time T_start, the process continues with step S106, which transfers the value of seqnr to oldseqnr and resets the value of seqnr from the sequence number Q for the current frame. The jump or difference between the sequence numbers of adjacent frames is calculated. Step S108 determines whether the absolute value of jump is greater than a threshold value, which in this example is five. If the absolute value of jump is greater than the threshold, step S110 increments the packet count N by one. If the absolute value of jump is not greater than the threshold, step S112 increments the count by the value of jump. The process then continues with step S102.

3. Alternative Methods for Counting

Packets may be counted in other ways if desired. One alternative way calculates the difference between sequence numbers for those frames having time values in their control information that are close to the sending time $t_S$ and the observation time $t_R$ mentioned above. According to this technique, the receiver 20 maintains a record of frames with their corresponding sequence number and sending-time information for an interval of time that starts at the sending time $t_{START}=t_S$ of a probe packet and ends at the observation time $t_{END}=t_R$ of the probe packet. The earliest frame having a time value equal to or greater than the time $t_{START}$ is identified as the starting frame and the latest frame having a time value equal to or less than the time $t_{END}$ is identified as the ending frame. This method attempts to identify the first and last frames in the time interval [$t_{START}$, $t_{END}$]. The difference D between the sequence numbers of the ending frame and the starting frame is calculated, modulo $2^{12}$, and the count of the packets during this interval is obtained from the expression D+1. This method of counting packets is generally not as reliable as the method described above because uncorrected bit errors in the sequence numbers of the frames can cause significant errors in the calculated count of packets.

The method described in the preceding paragraph may be modified to consider only those frames that appear to have no bit errors as indicated by a check of the frame CRC. This would essentially eliminate errors caused by corrupted data but it would also usually provide an estimate of buffer occupancy that is too small when signal-reception quality is low. When signal-reception quality is low, generally few frames are observed that have a good CRC and it is more likely that the frames identified as the starting and ending frames would not be the actual first and last frames in the time interval [$t_{START}$, $t_{END}$]. The frames in the time interval that precede and follow the frames deemed to be the starting and ending frames, respectively, would be erroneously excluded from the calculated count.

4. Variation of FIFO Queue

The techniques discussed above assume the buffer is used to implement a queuing scheme that is strictly or at least substantially FIFO compliant. These techniques can be adapted to work with implementations of other queuing schemes. One scheme described in the following paragraphs provides separate FIFO queues for different classes of packets.

A processing device 10 that implements an IEEE 802.11 compliant technology can also include a Quality of Service (QoS) enhancement that uses a multi-class FIFO queuing scheme. In one implementation according to the IEEE 802.11e standard, packets are placed into one of eight queuing classes or priorities that is indicated by a three-bit Traffic Identifier (TID) field in the MAC header. The techniques described above can be used to estimate the level of buffer occupancy for a particular queuing class by identifying and counting the packets for that class.

Some of the procedures discussed above are used to avoid or reduce counting errors caused by missing packets. An accurate estimate of the number of missing packet for a particular queuing class is more difficult to obtain because each missing packet could belong to any of the possible classes.

This can be handled in a variety of ways. Two techniques are described in the following paragraphs.

In one technique, the receiver 20 maintains a moving average of all packets in each class that can be identified by the value in its TID field, counts within a specified interval the number of packets that can be identified by the value in its TID field, and uses processes described above to estimate the number of unclassifiable packets that could not be observed or identified by the TID field within that specified interval. A relative probability for each class is calculated by dividing the moving average for that class by the sum of all the moving averages. An estimate of the number of unclassifiable packets within the given interval that belong to a particular class is calculated by multiplying the total number of unclassifiable packets in that interval by the relative probability for that class. This estimate is added to the count for that class.

This technique can be refined for implementations that associate a queuing priority to each queuing class. According to this refined technique, the receiver 20 maintains an ongoing estimate of the buffer occupancy level for each queuing class and calculates relative priorities from the moving averages for only those classes that have a queuing priority equal to or greater than the highest priority class that has a buffer occupancy greater than zero. This refinement is based on the observation that it is either impossible or unlikely that a packet in a lower priority class was be transmitted during the specified interval.

C. Estimating Buffer Capacity

The capacity of the buffer in the processing device 10 may be estimated by ensuring its buffer is filled to capacity and then using any of the methods discussed above to estimate the level of buffer occupancy. The buffer can be filled to capacity by sending a stream of packets to the processing device 10 at a rate and having a length that are sufficiently high to drive the buffer into an overflow condition.

In one implementation, a stream of packets is sent to the processing device 10 at a rate that exceeds the transmission rate of the device for some interval of time such as 100 msec., for example, and then the level of buffer occupancy is estimated as described above. Another stream of probe packets is sent to the processing device 10 at the same rate for a longer interval of time such as 200 msec., for example, and then the level of buffer occupancy is estimated again. If there is no significant difference between the two estimated levels, it can be assumed that both streams of packets were able to fill the buffer to its capacity. If there is a significant difference between the estimated levels, the process can be repeated using longer streams of probe packets until the estimated level no longer increases.

A reasonably accurate measure of the buffer capacity can be obtained by sending several streams of probe packets of sufficient rate and length to the processing device 10 to fill the buffer to its capacity, obtaining an estimate of buffer occupancy for each stream, and calculating an average of the estimates.

D. Other Applications

1. Estimating Competing Traffic Arrival Rates

Estimates of the level of buffer occupancy can be used to derive estimates of other parameters for use with various applications such as the techniques disclosed in the FEC Optimization Application mentioned above. One parameter that can be estimated is the arrival rate of so-called "competing packets" that complete with a stream of "primary packets" for processing resources and communication bandwidth. This can be done during intervals of time when the level of buffer occupancy is below the buffer capacity by deriving a measure of how rapidly the buffer occupancy level is changing.

Referring to the communication system illustrated in FIG. 1, for example, suppose the packet stream sent by the data source 2 is the stream of primary packets mentioned in the preceding paragraph. If the level of buffer occupancy in the device is below the buffer capacity, then the sum of the arrival rates of the primary packets and all other competing packets will equal the sum of the rate that packets are transmitted by the processing device 10 and the rate at which the level of buffer occupancy changes. For example, if the level of buffer occupancy at time $t_1$ is $b_1$ and the level of buffer occupancy at time $t_2$ is $b_2$, then the following equality holds provided there are no packet losses caused by buffer overflow:

$$p_A + p_C = \frac{b_2 - b_1}{t_2 - t_1} + p_D \qquad (2)$$

where
$b_1$=number of packets stored in the buffer at time $t_1$;
$b_2$=number of packets stored in the buffer at time $t_2$;
$p_A$=arrival rate of primary packets;
$p_C$=arrival rate of competing packets; and
$p_D$=transmission rate of all packets.

The rates and times may be expressed in terms of essentially any time unit that may be desired but it may be convenient to express these values in terms of uniform intervals of time referred to as time slots as defined in the FEC Optimization Application. The duration of these time slots is established such that in any given time slot the packet processing device 10 can receive a packet from the specified stream, can receive a competing packet and can transmit a packet but no more than one specified packet and no more than one competing packet can be received in a time slot and no more than one packet can be transmitted in a time slot. This can be expressed as $0 \leq p_A, p_C, p_D \leq 1$.

In many applications, the arrival rate $p_A$ of the primary packets is specified a priori to the receiver 20 and the transmission rate $p_D$ can be measured by counting the number of packets transmitted by the processing device 10 over some time period and calculating the average rate per time slot or any other desired unit time period. The levels of buffer occupancy $b_i$ for times $t_i$ can be estimated using any of the methods discussed above. The arrival rate of the competing packets can be estimated from the following expression, which is obtained by rearranging expression (2):

$$p_C = \frac{b_2 - b_1}{t_2 - t_1} + p_D - p_A \qquad (3)$$

The rate calculated from expression (3) is valid for intervals when the level of buffer occupancy is increasing or decreasing, but it is not valid if the buffer overflows or if packets are lost for any other reason. If desired, the arrival rate of competing packets can be derived from a linear or moving average of several estimates.

2. Estimating Transmission Rates

When the buffer is not empty, estimates of buffer occupancy can be used to derive the transmission rate parameter $p_D$ for use in various applications such as the techniques disclosed in the FEC Optimization Application. This parameter represents the transmission rate that the processing device 10 is capable of achieving when there are packets queued in the buffer and ready for transmission. If the buffer is not empty during some interval, then an estimation of the transmission rate during this interval may be calculated by counting the number of packets that are transmitted during the interval and calculating the average rate, as mentioned above.

If the buffer is empty during all or part of the counting interval, however, some other technique is needed to calculate this parameter because the average rate of the observed packets will very likely underestimate the transmission rate that the device is capable of achieving when the buffer is not empty. A method that may be applied in networks that use a Carrier Sense Multiple Access with Collision Avoidance (CSMA/CA) protocol is described below. The accuracy of this method depends on certain characteristics of the CSMA/CA protocol and depends on the buffer being empty when a packet arrives for transmission. The pertinent characteristics of the CSMA/CA protocol and a technique that may be used to determine whether the buffer is empty are described below.

3. Controlling Sending Rates

Estimates of the level of buffer occupancy can be used to control the sending rate of one or more data sources to prevent buffer overflow in the processing device 10. There are known methods of rate control that use a feature generally referred to as Early Congestion Notification (ECN) but these known methods require the processing device 10 to monitor the level of buffer occupancy and set a special ECN flag in a packet if the buffer occupancy level rises above some threshold. When the intended receiver of the packet detects the ECN flag, it sends an ECN feedback packet to the corresponding data source. The data source responds to the ECN feedback packet by reducing its sending rate.

Unfortunately, ECN is not widely implemented. Furthermore, if the processing device 10 is a wireless access point, for example, it is not appropriate for that device to implement ECN. According to the Open Systems Interconnection (OSI) Reference Model, the ECN flag should be set by an apparatus operating at OSI layer 3 (the network layer). Routers typically operate at OSI layer 3 but wireless access points, which are essentially bridges between wired and wireless networks, typically operate at OSI layer 2 (the link layer).

Unlike known ECN control methods, the control method described here does not require any special features or functions in the processing device 10. According to this method, the receiver 20 monitors the level of buffer occupancy using methods like those described above and sends an ECN feedback packet to the corresponding data source whenever the estimated level of buffer occupancy meets one or more criteria. For example, the receiver 20 can implement a simple scheme such as sending an ECN feedback packet when the estimated buffer occupancy level exceeds some threshold. If desired, the receiver 20 can implement a more sophisticated scheme that is optimized for a particular data source such as taking into account the rate of change in occupancy as well as the level of occupancy.

This method can be used in single-hop networks that use the Transmission Control Protocol (TCP). With TCP, a data source increases its sending rate until it is notified that packet loss is occurring. In response to the notification, the data source reduces its sending rate and then increases it again at a slower rate. This process repeats, which causes the sending rate to oscillate. One disadvantage of this process is that it relies on packet loss. This loss may be intolerable or at least highly objectionable in some applications such as streaming multimedia applications. For these types of applications, sending rates should be controlled without requiring packet loss.

Control processes that use the buffer occupancy estimation techniques of the present invention do not have this disadvantage. Packet loss is not required. The receiver 20 can detect an impending buffer overflow and notify the data source using the same notification as if a packet loss had occurred. This notification can be initiated when the level of buffer occupancy exceeds a threshold. The exact value for this threshold may not be critical for some applications because any buffer occupancy greater than zero is an indication that the sending rate is too high.

E. Clock Synchronization

The buffer-occupancy estimation techniques discussed above assume the data source of the probe packets and the receiver 20 use clocks that are synchronized with each other. These techniques may be adapted to account for situations in which the two clocks are not synchronized but differ from one another by an amount that is nearly constant or varies slowly. The receiver 20 adjusts a representation of the data source clock to achieve synchronization with its own clock. A basic adjustment technique that relies on a simplifying assumption is described first. More complex techniques are then described that do not rely on this assumption.

Referring to the communication system shown in FIG. 1, for example, a probe packet is sent by the data source 2 at time $t_S$ and the packet propagates along the communication path 3 to the processing device 10. If the buffer in the processing device 10 is empty when the packet arrives, it is assumed that the packet is transmitted along the communication path 11 immediately after a constant, very short processing time interval. The transmitted packet is observed by the receiver 20 almost immediately thereafter. The delay $\epsilon$ between the sending time $t_S$ and the observation time $t_R$ is equal to the total propagation time of the communication path 3 and the communication path 11 plus the processing time of the processing device 10 to buffer, retrieve and transmit the packet. If the communication path 3 conforms to one of the IEEE 802.3 standards and the communication path 11 conforms to one of the IEEE 802.11 standards, the delay $\epsilon$ will typically be on the order of 1 msec.

The delay between the observation time $t_R$ and the true sending time $t'_S$ as expressed relative to the clock in the receiver 20 can be represented as:

$$\epsilon = t_r - t'_S \quad (4)$$

The true sending time $t'_S$ can be represented as follows by rearranging expression (4):

$$t'_S = t_R - \epsilon = t_S + \delta \quad (5)$$

where $\delta$=the adjustment value to synchronize the sending and receiving clocks.

Given an accurate estimate of the delay $\epsilon$, the receiver 20 can calculate a reasonably accurate value for the adjustment value $\delta$ using the following expression, which is a rearrangement of expression (5):

$$\delta = t_R - t_S - \epsilon \quad (6)$$

Any error in the calculated value of $\delta$ is at most the magnitude of the delay $\epsilon$. By using this calculated value, the two clocks can be synchronized with reasonable accuracy provided the value of $\epsilon$ is very small as compared to the queuing delay that typically occurs in the processing device 10 For example, if the delay $\epsilon$ is 1 msec. and the queuing delay is 100 msec. when the buffer is full, clock times observed by the receiver 20 will have an error that is no more than one percent, which means the techniques described above can estimate buffer capacity with an error that is no more than one percent.

If the value for the delay $\epsilon$ is relatively large but constant, accurate synchronization between the send and receive clocks can still be achieved by excluding from the value of the delay $\epsilon$ the propagation delays along the communication path 3. The techniques discussed above are based on an assumption that the sending time $t_S$ is essentially equal to the time the probe packet arrives at the processing device 10. If the propagation delay along the path 3 is large enough that this assumption is not true, the sending time $t_S$ for a probe packet can be adjusted to compensate for this condition by calculating the adjustment value $\delta$ using a value for the delay $\epsilon$ that excludes the propagation delay along the path 3.

The technique for clock synchronization described above is simplified by an assumption that the probe packet is transmitted along the communication path 11 by the processing device 10 without any queuing delay. Under this assumption, transmission of a probe packet is delayed only by a constant, very short time interval in which the processing device 10 processes the probe packet for receipt and transmission. This assumption is not valid if noise or competing traffic from another transmitter prevents the communication path 11 from being idle when the processing device 10 is ready to transmit the packet. In these situations, the packet will be subject to additional delays because the processing device 10 must wait until the communication path 11 is idle before it can transmit the packet. If the communication path 11 implements a CSMA/CA protocol, for example, the amount of time the processing device 10 will wait cannot be calculated or predicted accurately by another device such as the receiver 20. As a result, the clock-adjustment value $\delta$ cannot be calculated accurately.

Errors in the calculated value $\delta$ that are created by noise or competing traffic can be avoided by having the receiver 20 calculate the clock-adjustment value $\delta$ only if the communication path 11 is idle for a specified period of time prior to the time of transmission $t_R$ of a probe packet. In an IEEE 802.11 compliant network, this specified period of time should be at least as long as the DIFS interval described below. The receiver 20 cannot determine reliably when the communication path 11 is idle if the processing device 10 can detect transmissions that the receiver 20 cannot observe. Problems created by this situation can be avoided or at least reduced significantly by having the receiver 20 calculate the clock-adjustment value $\delta$ multiple times and comparing the multiple values. If the different calculations yield values for $\delta$ that are substantially the same, it is likely that the probe packet for each calculation was not subject to any queuing delay. The receiver 20 can repeat the calculations until sufficient confidence in a calculated value for $\delta$ is achieved.

The receiver 20 applies the clock-adjustment value $\delta$ to the sending time value $t_S$ for each probe packet as it is received. If the sending and receiving clocks do not drift with respect to one another, the value for $\delta$ can be determined only once for each communication session if desired. If the difference between the two clocks varies, a revised value of the adjustment value $\delta$ may be determined when desired.

1. Determining if Buffer is Empty

The clock-adjustment value $\delta$ can be measured with reasonable accuracy provided the buffer in the processing device 10 is empty at the time of the measurement. The buffer occupancy estimation techniques discussed above cannot determine accurately whether the buffer is empty because the accuracy of those techniques depends on the data source clock and the receiver clock being synchronized. The technique discussed in the following paragraphs can be implemented by the receiver 20 to determine more reliably whether the buffer is empty if the communication path 11 uses a CSMA/CA protocol referred to as a Distributed Coordination Function (DCF). The principles underlying this technique can be adapted as necessary and applied in networks that use a different communication technology.

In CSMA/CA networks that conform to a IEEE 802.11 standard, the processing device 10 determines if the communication path 11 is busy before it attempts to transmit a packet. If the communication path 11 is not busy for a specified period of time known as the Distributed Interframe Space (DIFS), which may be expressed as DIFS=50 µsec., the processing device 10 transmits the packet and then waits for a positive acknowledgement (ACK) from the intended receiver that the packet was received successfully. If the processing device 10 does not receive an ACK after a specified period of time known as the Short Interframe Space (SIFS), which is 10 µsec., it will re-transmit the packet. If the communication path 11 is busy or if a re-transmission is needed, the processing device 10 waits until the communication path 11 is idle for a calculated period of time before it attempts a transmission. The period of time is equal to the DIFS interval plus a "backoff interval" calculated by a "backoff algorithm" described below. The processing device 10 uses a combination of carrier sensing circuitry and Virtual Carrier Sense (VCS) indicators based on observed traffic to determine whether the communication path 11 is busy. Details of this process are not needed to understand principles of the present invention and are omitted from this discussion.

The backoff algorithm calculates a backoff interval that is equal to some number of time slots according to the following expression:

$$T_W = R \cdot TS \qquad (7)$$

where

R=a random or pseudo-random number in the interval [0, CW];

CW=Contention Window interval; and

TS=interval of a time slot.

For IEEE 802.11b, for example, the length of the time TS slot is 20 µsec. and the Contention Window (CW) interval has an initial minimum value $CW_{min}$=31 time slots. For IEEE 802.11g, for example, the length of the time slot TS is 9 µsec. and the CW interval has an initial minimum value $CW_{min}$=15 time slots. The length of the CW window may be increased to a maximum of 1023 time slots as explained below.

The processing device 10 uses a count-down timer to wait for an interval of time equal to $T_W$ before attempting a transmission. If the processing device 10 senses that the communication path 11 is busy, the count-down timer is suspended until the communication path 11 remains idle for the DIFS interval. When the count-down timer reaches zero, the processing device 10 attempts a transmission. The reception of an ACK from the intended receiver 20 will cause the processing device 10 to reset CW to its minimum value $CW_{min}$ in preparation for transmission of the next packet. If an ACK is not received, the value of CW is doubled up to its maximum allowed value and the process repeats for the next attempted transmission.

The technique described below is based on observed wait times for the first or initial transmission of a packet. The first transmission of a packet can be distinguished from all subsequent re-transmissions of that packet by the value of a bit called the Retry_flag that is set in the MAC header. The Retry_flag is set to zero for the first transmission and is set to one for any subsequent re-transmission. The technique is based on the fact that the buffer in the processing device 10 is known to be empty if the first transmission of a packet by the processing device 10 is preceded by the maximum possible waiting interval equal to DIFS+$T_{WX}$ in which no other transmissions occur, including transmissions from other transmitters in the same or neighboring networks. The interval $T_{WX}$ may be expressed as $$T_{WX} = CW_{min} \cdot TS \tag{8}$$

If the receiver 20 receives a packet at time $t_R$ and no other transmissions are observed during the interval of time $[t_R - (DIFS+T_{WX}), t_R]$, then it is known that the buffer in the processing device 10 was empty at the time the transmitted packet arrived at the transmitter. In other words, this idle interval is a condition that is sufficient to imply the transmission of this particular packet was not postponed by any queuing delays. This condition can be proven by contradiction, assuming the packet was subject to queuing delays yet is still observed at time $t_R$.

In this example, $t_R$ is defined as the time the first bit of the packet is observed by the receiver 20. If the receiver 20 instead detects the time that the last bit of the packet is received, then the observation time of the first bit can be obtained from the expression $$t_R = t_{LAST} - \frac{B}{V} - T_{PRE} \tag{9}$$

where $t_{LAST}$=observation time of the last bit in the packet;
B=number of bits in the packet;
V=transmission rate in bits per second; and
$T_{PRE}$=time interval to receive all frame preamble information.

Values for the parameters B and V can often be obtained from a customized IEEE 802.11 compliant device driver in the receiver 20 but the value for the time interval $T_{PRE}$ cannot often be obtained. If this value is not otherwise available, satisfactory results can be achieved by using a value determined by empirical tests, by consulting a specification of the appropriate communication protocol, or by any other manner that may be desired. For IEEE 802.11b and 802.11g compliant communication paths, for example, the appropriate specifications indicate the values for the interval $T_{PRE}$ are 192 μsec. and 24 μsec., respectively.

It may be helpful to point out that the idle interval described above is a sufficient condition but not a necessary condition for the buffer to be empty. For this reason, the technique is better suited for networks in which the communication path 11 is not always heavily used. This technique can be used for other communication protocols using some type of collision avoidance scheme if the maximum possible initial waiting interval $T_{WX}$ is known.

When the receiver 20 determines the buffer was empty for a probe packet, the clock adjustment factor δ can be measured and then used to synchronize receiver and data source clocks. The levels of buffer occupancy can then be estimated using the techniques described above.

F. Estimating Transmission Rates when the Buffer is Empty

The receiver 20 can use techniques described above to obtain an accurate estimate of the transmission rate parameter $p_D$ by calculating the average number of packets that are transmitted per unit time period by the processing device 10 provided the buffer in the device is not empty. If the buffer is empty, no packets are transmitted; therefore, some other technique should be used to estimate accurately this parameter if the buffer is empty. One technique that may be used to estimate $p_D$ is described below. This technique estimates the sum $\Sigma T_T$ of the individual times $T_T$ required by the processing device 10 to transmit each of M unique packets and derives the transmission rate parameter by calculating the quotient of M divided by the sum $\Sigma T_T$. The technique that estimates the individual time intervals required to transmit a packet uses certain characteristics of the CSMA/CA protocol that are discussed in the following paragraphs.

Figure 6:
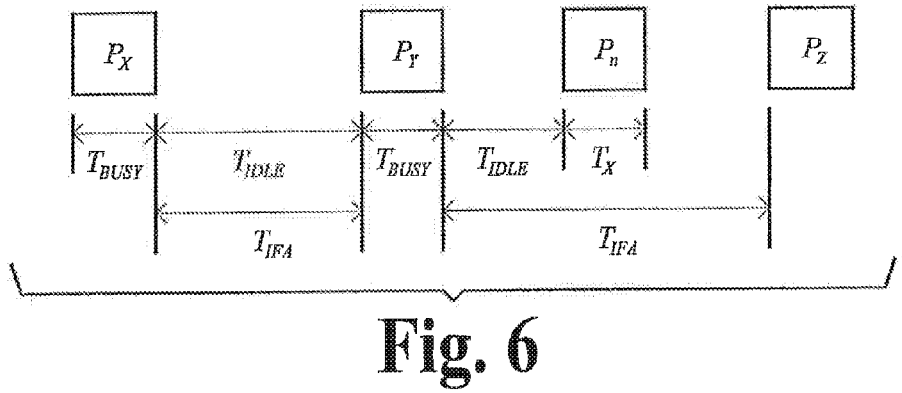
FIGS. 6 to 9 are schematic diagrams of packets in a stream of frames.
Figure 7:
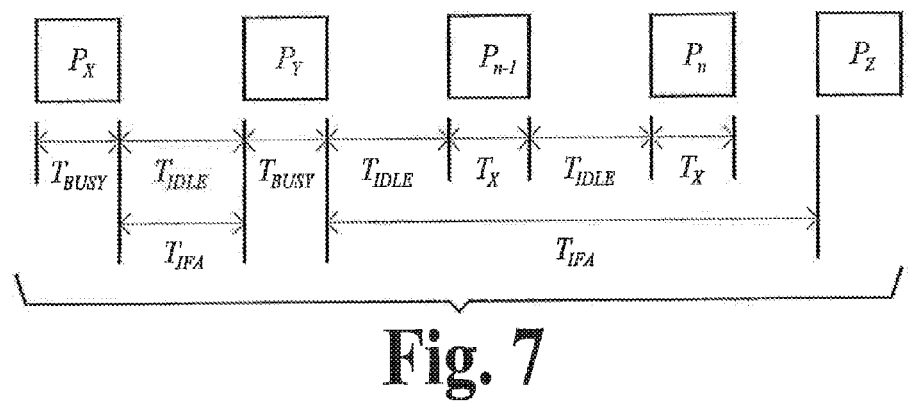

FIGS. 6 and 7 illustrate packets conveyed by streams of frames that are observed on a communication channel such as the communication path 11. Referring to FIG. 6, the frame conveying packet $P_n$ was transmitted by the processing device 10. The frames conveying packets $P_X$, $P_Y$ and $P_Z$ were transmitted by one or more devices other than the processing device 10 and represent competing traffic. Referring to FIG. 7, the frames conveying packets $P_{n-1}$ and $P_n$ were transmitted by the processing device 10. The frames conveying packets $P_X$, $P_Y$ and $P_Z$ were transmitted by some device other than the processing device 10 and represent competing traffic. For the purpose of the model described here, all competing traffic may be viewed as originating from a single device if desired. The channel-busy time $T_{BUSY}$ represents the duration of intervals during which frames of competing traffic are observed. The interframe-arrival time $T_{IFA}$ represents the duration of intervals between successive frames of competing traffic. The channel-transmit time $T_{XMIT}$ represents the cumulative duration of intervals during which all frames transmitted by the processing device 10 within an inter-frame arrival time are observed. In the example shown in FIG. 6, the channel-transmit time $T_{XMIT}$ is equal to the time needed to transmit the frame conveying packet $P_n$. In the example shown in FIG. 7, the channel-transmit time $T_{XMIT}$ is equal to the sum of the individual times $T_X$ during which the frames conveying packets $P_{n-1}$ and $P_n$ are observed. The channel-idle time $T_{IDLE}$ represents the duration of intervals during which no traffic is observed.

The statistical distributions or probability density functions of the channel-busy time $T_{BUSY}$, the channel-transmit time $T_{XMIT}$ and the inter-frame arrival time $T_{IFA}$ can be estimated by observing traffic on the communication channel. The average for each time can be calculated from the estimated statistical distributions. The probability λ that the communication channel is conveying competing traffic may be calculated from the expression $$\lambda = \frac{\overline{T}_{BUSY}}{\overline{T}_{BUSY} + \overline{T}_{IFA}} \tag{10}$$

where $\overline{T}_{BUSY}$=the average channel-busy time; and
$\overline{T}_{IFA}$=the average interframe-arrival time.

The probability φ that the communication channel is conveying traffic transmitted by the processing device 10 may be calculated from the expression $$\varphi = \frac{\overline{T}_{XMIT}}{\overline{T}_{BUSY} + \overline{T}_{IFA}} \tag{11}$$

where $T_{XMIT}$=the average channel-transmit time.

The model described below can be used to estimate the time interval $T_T$ required to transmit a packet, which is the sum of a wait time $W_T$ and the time $T_X$ needed by the processing device 10 to inject all of the information for the frame conveying the packet into the communication path 11. This model includes four general situations and examples of these situations are illustrated in FIGS. 8A-8F.

Figure 8A:
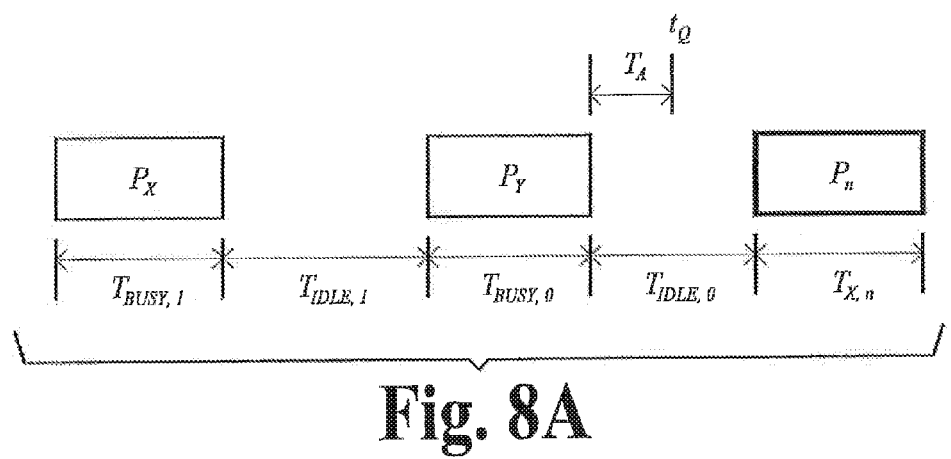

In the first situation, a packet $P_n$ from a data source arrives at the processing device 10 at time $t_Q$ within a channel-idle interval immediately after competing traffic and is ready for transmission immediately after its arrival. For this model, the delay between the time of packet arrival and the time the packet is ready for transmission is assumed to be negligible. Examples of the first situation are shown in FIGS. 8A and 8C. The interval $T_A$ is that portion of the channel-idle time $T_{IDLE}$ that occurs before the packet arrival time $t_Q$.

Each of these situations can be modeled statistically. A source code program fragment is shown below that illustrates schematically one algorithm with an input parameter v that can be used to estimate the wait time $W_T$ for the processing device 10 to transmit the packet $P_n$. The input parameter v is set equal to zero if the packet immediately preceding the packet $P_n$ is a competing packet $P_Y$ that was transmitted by some other device. The input parameter v is set equal to one if the packet immediately preceding the packet $P_n$ is a packet $P_{n-1}$ that was transmitted by the processing device 10. This as well as the other program fragments shown in this disclosure include statements that have syntactical features of the C programming language; however, no particular language or implementation is critical. These program fragments are not intended to be complete, practical or efficient solutions but are presented merely to illustrate basic principles that are sufficient to enable a skilled person to implement a practical solution.

Figure 8B:
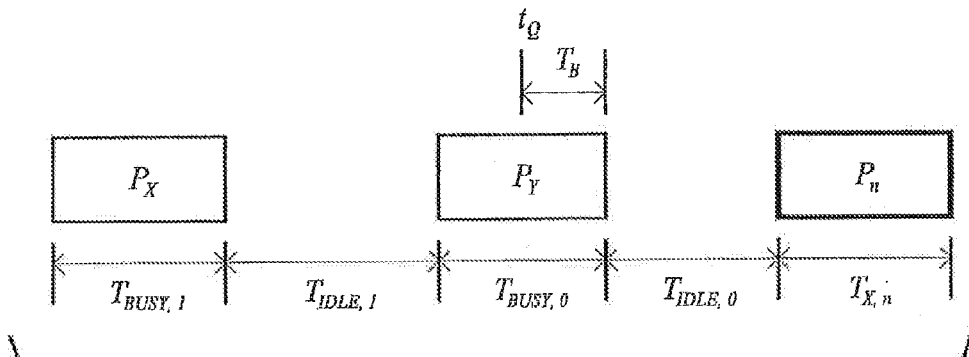
Figure 8C:
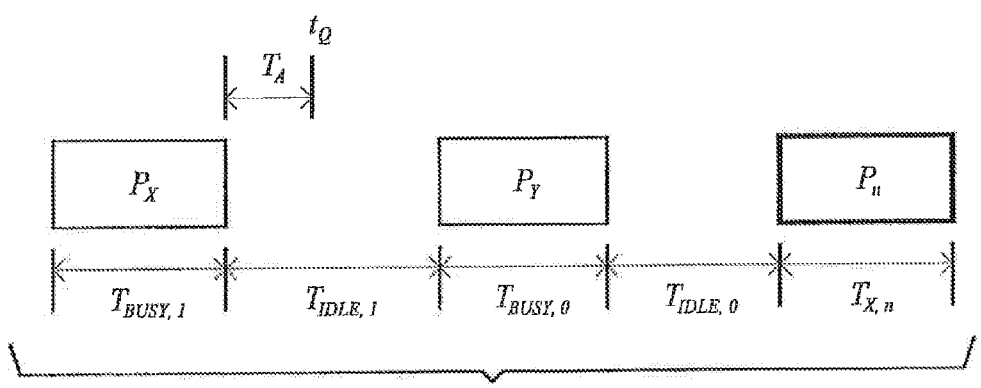
Figure 8D:
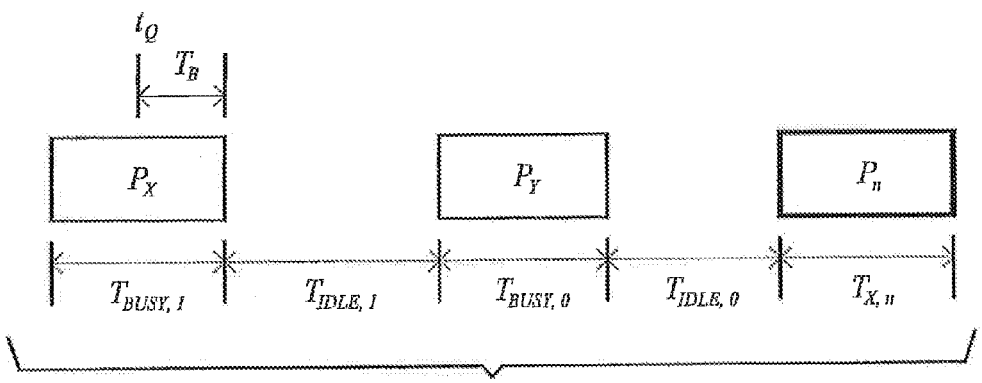

```
[1.0]   int calc_wait_time(int v) {
[1.1]     if (T_idle[0] > (DIFS + T_wx))
[1.2]       WT = 0;                              // Fig. 8A
[1.3]     else if (T_idle[0] == DIFS)
[1.4]     {
[1.5]       T1 = 0.5 * DIFS;                     // Fig. 8A
[1.6]       T2 = (DIFS + 0.5 * T_busy[0]);       // Fig. 8B, CW=0
[1.7]       WT = Pr1 * T1 + Pr2 * T2
[1.8]     }
[1.9]     else if (T_idle[0] > DIFS && T_idle[0] <= (DIFS + T_wx))
[1.10]    {
[1.11]      T3 = 0;                              // Fig. 8A
[1.12]      T4 = (T_idle[0] * (1-0.5*v) +
                 0.5 * T_busy[0]) * (1-v);       // Fig. 8B, 0<CW<=CW_min
[1.13]      T5 = (T_idle[0] + T_busy[0] +
                 T_idle[1] + 0.5 * T_busy[1]);   // Fig. 8D, 0<CW<=CW_min
[1.14]      T6 = (T_idle[0] + T_busy[0] +
                 T_idle[1] + T_busy[1] +
                 T_idle[2] + 0.5 * T_busy[2]);
[1.15]      WT = Pr3 * T3 + Pr4 * T4 +
                 Pr5 * T5 + Pr6 * T6
[1.16]    }
[1.17]    else
[1.18]      WT = -1;                             // estimated wait interval is undefined
[1.19]    return WT;
[1.20]  }
```

In the second situation, a packet $P_n$ from a data source arrives at the processing device 10 at time $t_Q$ within a channel-busy interval and is ready for transmission immediately after its arrival. Examples of the second situation are shown in FIGS. 8B and 8D. The interval $T_B$ is that portion of the channel-busy time $T_{BUSY}$ that occurs after the packet arrival time $t_Q$.

Figure 8E:
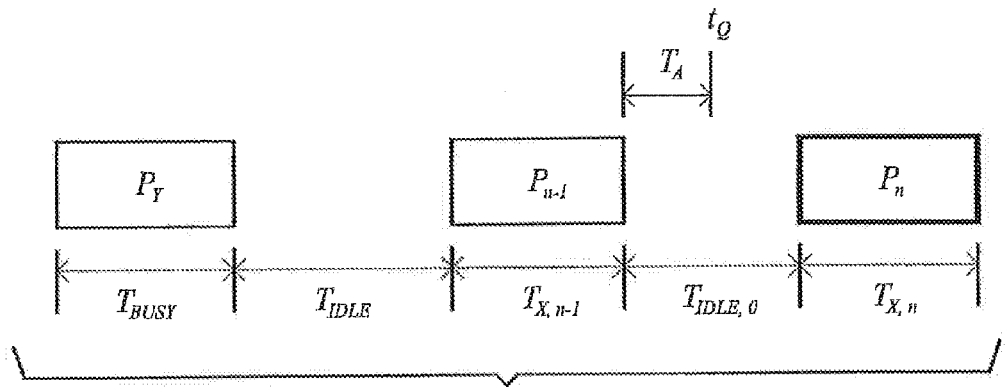

In the third situation, a packet $P_n$ from a data source arrives at the processing device 10 at time $t_Q$ within a channel-idle interval immediately after the processing device 10 transmitted packet $P_{n-1}$ and packet $P_n$ is ready for transmission immediately after its arrival. An example of the third situation is shown in FIG. 8E. The interval $T_A$ is that portion of the channel-idle time $T_{IDLE}$ that occurs before the packet arrival time $t_Q$.

Figure 8F:
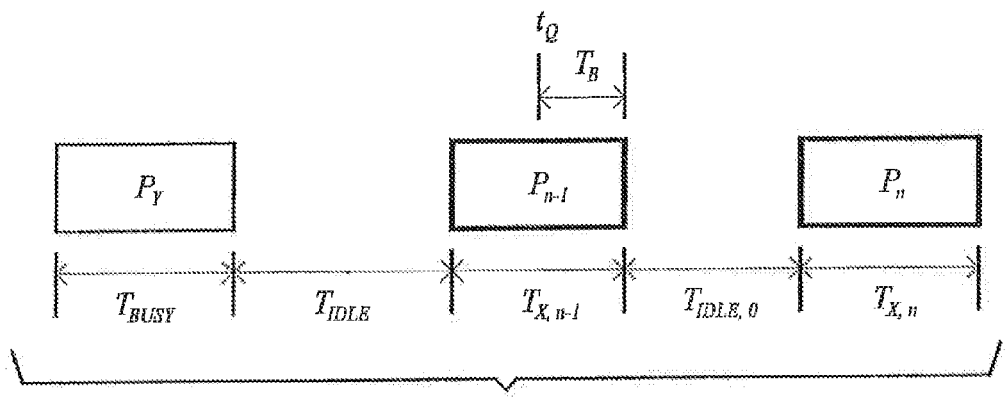

In the fourth situation, a packet $P_n$ from a data source arrives at the processing device 10 at time $t_Q$ during the time the processing device 10 is transmitting the packet $P_{n-1}$ and packet $P_n$ is ready for transmission immediately after the transmission of packet $P_{n-1}$ is completed. An example of the fourth situation is shown in FIG. 8F. The interval $T_B$ is that portion of the channel-busy time $T_{BUSY}$ that occurs after the packet arrival time $t_Q$.

The program variables DIFS and T_wx represent the time intervals DIFS and $T_{WX}$, respectively, discussed above. The array elements T_idle[n] and T_busy[n] represent the intervals $T_{IDLE, n}$ and $T_{BUSY, n}$, respectively, illustrated in the figures. The variables T1 through T6 store interim results of wait-time calculations. The variables Pr1 through Pr6 represent probabilities that are discussed below.

Referring to statement [1.1], the sum DIFS+T_wx represents the longest possible channel-idle interval the processing device 10 can be required to wait before attempting an initial transmission of a packet. If the channel-idle time T_idle[0] immediately prior to the transmission of the packet $P_n$ is greater than this interval, then it is known that the packet $P_n$ did not encounter any queuing delay or backoff wait delay. The wait time WT is set to zero in statement [1.2].

Referring to statement [1.3], if the channel-idle time T_idle [0] immediately prior to the transmission of the packet $P_n$ is equal to the interval DIFS then it is known that the packet arrived at the processing device 10 during either the channel-idle time $T_{IDLE, 0}$ as shown in FIG. 8A or 8E, or during the channel-busy time $T_{BUSY, 0}$ as shown in FIG. 8B. Referring to statement [1.6], if the packet $P_n$ arrived during the channel-idle time $T_{IDLE, 0}$ immediately after a competing packet as shown in FIG. 8A, the calculation for T2 includes the expected value for the channel-busy interval $T_{BUSY, 0}$ for that competing packet. If the packet $P_n$ arrived during the channel-idle time immediately after a packet $P_{n-1}$ as shown in FIG. 8E, the calculation of T2 is irrelevant because the corresponding probability Pr2 is equal to zero when v=1 as shown in expressions (13) and (15) below. If the packet arrived during the channel-busy time $T_{BUSY, 0}$, the backoff algorithm would have calculated a backoff interval $T_W$ equal to zero as shown in expression (7). The packet could have arrived as late as the end of the $T_{IDLE, 0}$ interval and been transmitted immediately. The packet could have arrived as early as the start of the $T_{BUSY, 0}$ interval but no earlier because, if the packet had arrived earlier during the $T_{IDLE, 1}$ interval as shown in FIG. 8C, for example, it would have been transmitted during the $T_{IDLE, 1}$ interval The model assumes the probability density function of the packet arrival time during the channel-idle and channel-busy intervals is uniformly distributed. If the arrival time occurs during the $T_{IDLE, 0}$ interval, the expected or average wait-time T1 (see statement [1.5]) prior to transmission is equal to one-half of this interval. This situation occurs with probability Pr1. If the arrival time occurs during the $T_{BUSY, 0}$ interval immediately after a competing packet, the expected wait-time T2 (see statement [1.6]) prior to transmission is equal to DIFS plus one-half of this interval. If the arrival time occurs during the $T_{BUSY, 0}$ interval immediately after a packet $P_{n-1}$ that is not a competing packet, the expected value of the channel-busy interval is excluded from the calculation as explained above. These two situations are assumed to be equally likely and collectively occur with probability Pr2. As a result, the estimated wait time $W_T$ is obtained from the sum of these average wait times multiplied by their respective probabilities of occurrence as shown in statement [1.7].

The probabilities Pr1 and Pr2 may be obtained from the expressions $$Pr1 = \frac{PI1}{PI1 + PB1} \quad (12)$$

$$Pr2 = \frac{PB1}{PI1 + PB1} \quad (13)$$

$$\text{where } PI1 = (1 - v \cdot \varphi - \lambda) \cdot \frac{DIFS}{\overline{T}_{IFA}} \cdot \left(\frac{1 + (1 - v) \cdot CW_{min}}{CW_{min} + 1}\right) \quad (14)$$

$$PB1 = \lambda \cdot \frac{(1 - v)}{CW_{min} + 1} \quad (15)$$

$$v = \begin{bmatrix} 0 = \text{previous packet is a competing packet} \\ 1 = \text{previous packet is not a competing packet} \end{bmatrix} \quad (16)$$

PI1 is the probability that packet $P_n$ arrived during a channel-idle interval, and PB1 is the probability that packet $P_n$ arrived during a channel-busy interval and $T_W$=0.

The term $(1-v\cdot\varphi-\lambda)$ in expression (14) represents the probability that packet $P_n$ arrived during a channel-idle interval, whose average duration is the average interframe-arrival time $\overline{T}_{IFA}$, and the remaining factors in the expression weight this probability to account for the fact that the actual $T_{IDLE, 0}$ interval is only DIFS in length and for the fact the backoff interval $T_W$ must have a value equal to zero, which is only one possibility out of a total of $CW_{min}$+1 possible values, if the preceding packet was not a competing packet.

The term $\lambda$ in expression (15) represents the probability that packet $P_n$ arrived during a channel-busy interval and the remaining factor in the expression weights this probability to account for the fact that the previous packet must be a competing packet and for the fact that the backoff interval $T_W$ must have a value equal to zero, which is only one possibility out of a total of $CW_{min}$+1 possible values.

Referring to statement [1.9], if the channel-idle time T_idle [0] immediately prior to the transmission of the packet $P_n$ is greater than the interval DIFS but not greater than the longest possible wait time DIFS+T_wx then it is known the packet arrived either during the channel-idle interval immediately before its transmission or during one of the channel-busy intervals preceding the transmission. If the packet arrived during one of the channel-busy intervals, the backoff algorithm would have calculated a backoff interval $T_W$ greater than zero but less than or equal to $CW_{min}$·TS.

If the arrival time occurs during the $T_{IDLE, 0}$ interval, the wait-time T3 (see statement [1.11]) prior to transmission is known to be zero or substantially zero because the only delay is due to processing in the processing device 10, which is assumed to be negligible. This situation occurs with probability Pr3. If the arrival time occurs during the $T_{BUSY, 0}$ interval, the expected wait time T4 (see statement [1.12]) is equal to one-half of this interval plus the subsequent channel-idle interval. This situation occurs with probability Pr4. If the arrival time occurs during one of the previous channel-busy intervals, the expected wait-time is equal to one-half of this interval plus all subsequent busy and idle intervals ending at the time of transmission (see statements [1.13] and [1.14]). These situations occur with various probabilities Pr5, Pr6, etc. according to which of the busy intervals coincide with the packet arrival time; however, it is known these situations cannot occur unless the preceding packet is a competing packet. This is accounted for by the term (1-v) in expressions (19) and (20) that may be used to calculate the probabilities Pr5 and Pr6. The estimated wait time $W_T$ is obtained from the sum of all of these wait times multiplied by their respective probabilities of occurrence as shown in statement [1.15]. The term Pr3*T3 is included in the summation only for the purposes of illustrating a concept. In a practical implementation, this term could be excluded because it is equal to zero.

The probabilities Pr3 to Pr6 may be obtained from the expressions $$Pr3 = \frac{PI2}{PI2 + PB2A} \quad (17)$$

$$Pr4 = \frac{PB2}{PI2 + PB2A} \quad (18)$$

$$Pr5 = (1 - v) \cdot \left(\frac{PB3A}{PI2 + PB2A}\right) \quad (19)$$

$$Pr6 = (1 - v) \cdot \left(\frac{PB4A}{PI2 + PB2A}\right) \quad (20)$$

-continued where $$PI2 = \begin{cases} (1-\varphi-\lambda)\cdot\left(\dfrac{CW_{min}\cdot TS}{\overline{T}_{IFA}}\right) = (1-\varphi-\lambda)\cdot\dfrac{T_{WX}}{\overline{T}_{IFA}} & \text{for } v = 0 \\ (1-\varphi-\lambda)\cdot\left(\dfrac{\sum_{R=0}^{G-1}(G-R)\cdot TS}{\overline{T}_{IFA}}\right) = (1-\varphi-\lambda)\cdot\dfrac{G\cdot(G+1)\cdot TS}{2\overline{T}_{IFA}\cdot(CW_{min}+1)} & \text{for } v = 1 \end{cases} \quad (21)$$

$$PB2 = \begin{cases} (\varphi+\lambda)\cdot\dfrac{CW_{min}}{CW_{min}+1} & \text{for } v = 0 \\ (1-\varphi-\lambda)\cdot\dfrac{DIFS+G\cdot TS}{\overline{T}_{IFA}\cdot(CW_{min}+1)} & \text{for } v = 1 \end{cases} \quad (22)$$

$$G = \frac{T_{IDLE,0} - DIFS}{TS} \quad (23)$$

$$PB3A = PB3 \cdot \frac{CW_{min,1}+1}{\overline{T}_{IFA}} \quad (24)$$

$$PB3 = (\varphi+\lambda)\cdot\frac{CW_{min,1}+1}{CW_{min}+1} \quad (25)$$

$$CW_{min,1} = \max\left(0, CW_{min} - \frac{T_{IFA,1} - DIFS}{TS}\right) \quad (26)$$

$$PB4A = PB4 \cdot \frac{CW_{min,2}+1}{\overline{T}_{IFA}} \cdot \frac{CW_{min,3}+1}{\overline{T}_{IFA}} \quad (27)$$

$$PB4 = (\varphi+\lambda)\cdot\frac{CW_{min,2}+1}{CW_{min}+1} \quad (28)$$

$$CW_{min,2} = \max\left(0, CW_{min} - \frac{T_{IFA,2} - DIFS}{TS}\right) \quad (29)$$

$$CW_{min,3} = \max\left(0, CW_{min,2} - \frac{T_{IFA,1} - DIFS}{TS}\right) \quad (30)$$

$$PB2A = PB2 + (1-v)\cdot(PB3A + PB4A + \ldots) \quad (31)$$

The symbol $CW_{min,n}$ denotes the initial Contention Window used by the backoff algorithm for the $T_{BUSY,n}$ interval and the symbol $T_{IFA,n}$ denotes the interframe-arrival time between the $T_{BUSY,n}$ and $T_{BUSY,n-1}$ intervals.

Statements [1.11] to [1.15] in the program fragment shown above perform interim time calculations for a fixed number of channel-idle and channel-busy intervals. The probabilities Pr3 to Pr6 for these calculations may be obtained from expressions (17) to (31). If the input parameter v is equal to one, which indicates the immediately preceding packet is not a competing packet, then the probabilities Pr5 and Pr6 are not needed. As a result, the calculations shown in expressions (24) to (30) need not be performed and PB2A is set equal to PB2. In preferred implementations, calculations are performed only for those intervals that occur within a limited range of time prior to the transmission of the packet $P_n$. The limited range of time begins at the point where the sum of its included channel-idle intervals equals or exceeds the longest possible wait time $DIFS+T_{WX}$. The limited range of time begins even later if the processing device 10 transmitted a frame within the range. If this is the case, the limited range begins at the end of the previously transmitted frame. The model does not include intervals in its calculations that precede the later of the previous transmission of a packet by the processing device 10 and the start of the shortest possible range in which the channel-idle intervals sum to the maximum wait time.

If the model needs to include more channel-busy and channel-idle intervals in its calculation, the probabilities for the additional intervals may be obtained using expressions that are derived in a manner analogous to those shown above.

Referring to statement [1.17], if none of the previous tests are satisfied then the model concludes the wait-time cannot be determined. This situation can occur if the processing device 10 detects competing traffic that the receiver 20 cannot detect. Otherwise, this situation may indicate that the processing device 10 or some other transmitting device has violated one or more provisions of the communication protocol.

The time $T_T$ required by the processing device 10 to transmit a frame with the packet $P_n$ is obtained from the sum of the estimated wait time $W_T$ and the time $T_X$ required to inject information for the frame into the communication path 11. After accumulating the total time $\Sigma T_T$ that the processing device 10 required to transmit M unique packets, the receiver can obtain a reasonably accurate estimate of the transmission rate from the following expression:

$$p_D = \frac{M}{\Sigma T_T} \quad (32)$$

G. Signal-Reception Quality

1. Overview

The monitoring of transmissions on the communication path 11 may be used for a wide variety of purposes including the estimation of parameters like the rate of transmission $p_D$. The usefulness or reliability of results that are based on observed signals is affected by the reception quality of those signals received by the monitoring device. For example, the correctness of observed information affects the accuracy with which the parameter $p_D$ can be estimated, and the accuracy of this parameter is critical to the optimal operation of techniques like those disclosed in the FEC Optimization Application. The techniques described above include provisions for improving the accuracy of estimation during periods when signal reception is impaired by interference or low signal-reception quality. These provisions allow various aspects of the present invention to obtain more accurate results in situations where conventional monitoring techniques do not work well. Nevertheless, even these provisions cannot prevent the estimation accuracy from degrading to unacceptable levels if the signal-reception quality becomes too low.

Techniques are described below that can be implemented in the receiver 20 to determine if signal-reception quality is high enough to permit its monitoring operation to estimate various parameter values with sufficient accuracy. These techniques are based on two assumptions regarding the way in which packets are transmitted over the communication path 11: (1) the processing device 10 adapts its rate of transmission according to communication path conditions and (2) the packets are transmitted with some control information that allows an estimate of the number of unique transmitted packets to be calculated. Using these two assumptions, the receiver 20 can count the number of packets it actually observes between two received packets that were destined to itself and then compare this count with an estimated number of packets calculated from the control information for the observed packets. If the two values are equal or are sufficiently close to one another, the signal-reception quality should be high enough to allow other parameter values to be estimated accurately.

The techniques discussed below may be used with essentially any application that needs to assess signal-reception quality. They are not limited in their application to the estimation processes discussed above.

a) Transmission-Rate Adaptation

According to the first assumption, the processing device 10 adapts its rate of transmission according to communication path conditions. This implies the receiver 20 will generally receive each unique packet destined to the receiver 20 and its associated control information at least once without any data corruption. With transmission-rate adaptation, the processing device 10 adapts the transmission rate of packets according to how reliably the intended receiver is receiving its packets. If the processing device 10 consistently receives acknowledgements from a receiver verifying successful receipt of packets, the processing device 10 may maintain or increase the transmission rate for packets destined to that receiver. If the processing device 10 consistently fails to receive acknowledgments from a receiver, the processing device 10 lowers the transmission rate for packets destined to that receiver. This technique tends to use higher rates of transmission when the signal-reception quality is high and use lower rates of transmission when the signal-reception quality is low.

When the communication path 11 is a wireless network and the signal-reception quality is low, the receiver 20 may not be able to observe packets that are transmitted at a high rate to other receivers or it may not be able to observe those packets without significant data corruption. In an IEEE 802.11a or 802.11g compliant network, for example, the processing device 10 may adapt its transmissions to send information at rates up to 54 Mb/sec. If a receiver is near the processing device 10 and local conditions are such that signal-reception quality is very high, it is likely the processing device 10 will transmit packets to that receiver at or near the maximum rate. If the receiver 20 is far away from the processing device 10 and/or its local conditions are such that signal-reception quality is very low, it is unlikely the receiver 20 will be able to receive reliably those packets that are transmitted at the highest rates to other receivers.

Because of transmission-rate adaptation, however, the receiver 20 can receive its own packets with little if any corruption even if receiving conditions are poor provided the receiver 20 is within range of the processing device 10. If the signal-reception quality for the receiver 20 is very low, the processing device 10 will decrease the rate of transmission to the receiver 20 until communication becomes reasonably reliable. When the transmission rate has been adapted to match communication path conditions, the frame-error rate is typically on the order of $10^{-1}$ or less. If the processing device 10 does not receive an acknowledgement for a particular packet, it transmits that packet again four or more times; consequently, the probability that the receiver 20 will not successfully receive a packet under the conditions mentioned here is on the order of $10^{-5}$ or less. With the use of transmission-rate adaptation, the receiver 20 will generally receive each unique packet destined to the receiver 20 and its associated control information at least once without any data corruption.

b) Control Information

According to the second assumption, the packets are transmitted with some control information that allows an estimate of the number of unique transmitted packets to be calculated. In IEEE 802.11 compliant networks, the packet sequence number in the MAC header can provide the necessary control information.

2. Assessing Signal-Reception Quality

The specific implementations described below assume the communication protocol used for the communication path 11 conforms to one of the IEEE 802.11 standards. These protocols provide a 12-bit sequence number in the MAC header for each packet as described above. The sequence number is incremented by one, modulo $2^{12}$, for each successive unique packet that is transmitted by a particular device.

When the receiver 20 receives two successive unique packets $P_A$ and $P_B$ from the processing device 10 that are destined to that receiver, the number D of unique intervening packets that were transmitted by the processing device 10 to one or more other receivers can be obtained from the difference between the sequence numbers $Q_A$ and $Q_B$ for those packets as follows:

$$D=(Q_B-Q_A-1) \text{modulo } 2^{12} \quad (33)$$

where $Q_B$=sequence number of packet $P_B$ destined to the receiver; and $Q_A$=sequence number of the preceding packet $P_A$ destined to the receiver.

Because of transmission-rate adaptation, it is highly likely that the intended receiver will receive these two sequence numbers without corruption. As mentioned above, the frame CRC can be used to determine whether the data in a frame has been received without corruption. Nevertheless, the difference between the two sequence numbers may not always indicate the exact number of intervening packets if the queuing scheme used in the processing device 10 deviates from a strict FIFO scheme as discussed above. This aspect is discussed below in greater detail.

The receiver 20 can count the packets that it observes using any of the techniques described above. If the signal-reception quality for the receiver 20 is high enough that it can observe all or nearly all of the packets that are transmitted by the processing device 10, then a count C of those packets will be equal or nearly equal to the calculated difference D. If the signal-reception quality for the receiver 20 is low enough that it fails to observe a significant number of packets that are transmitted by the processing device 10, then its count C of those packets will differ from the calculated difference D. Conversely, good agreement between C and D can provide a reasonably accurate indication that signal-reception quality is high. A lack of good agreement does not necessarily indicate reception-quality is low because there may be gaps or jumps in a stream of sequence numbers that distort the calculated difference D. The reason for this is discussed below.

In one implementation, a preliminary measure E of reception quality is calculated from the expression $$E = D - C \qquad (34)$$

This measure is filtered or smoothed to remove short-term perturbations that might otherwise degrade the reliability of the measure. An example of a suitable smoothing filter is described below. A value of E that is zero or close to zero generally indicates signal-reception quality is high. If the value of E is large, however, no conclusion about reception quality should be reached without taking into account other considerations such as bit-error rates, which are discussed below.

3. Sequence Number Jumps

Gaps or jumps may occur in a stream of sequence numbers if the processing device 10 implements a queuing scheme that is not strictly FIFO at all times and reorders packets for transmission under certain conditions. For example, as explained above, some IEEE 802.11 compliant processing devices like routers or wireless access points may retrieve and transmit packets from their buffers in an order that is not strictly FIFO whenever the devices encounter a degradation in the quality of a wireless link to one of several receivers.

Figure 9:
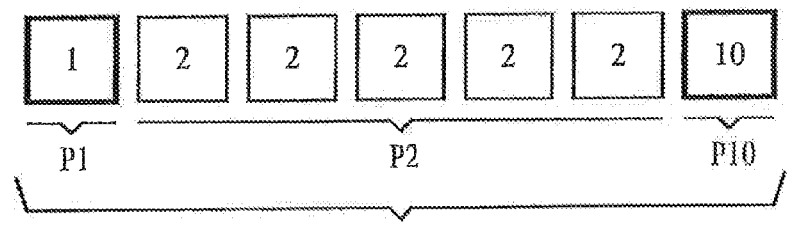

FIG. 9 is a schematic illustration of an example of a stream of frames with packets that could be transmitted by such a device. Each frame is represented by a box with a number that expresses its sequence number. Frames with packets that are destined to the receiver 20 are represented by boxes drawn with lines that are wider than the lines for boxes representing packets destined to other receivers. Referring to the example shown in FIG. 9, a frame with packet P1 and sequence number $Q_A = 1$ that is destined to the receiver 20 is transmitted successfully to that receiver. An attempt to transmit the frame with packet P2 and sequence number Q=2 to another receiver is suspended after five attempts. A frame with packet P10 and sequence number $Q_B = 10$ that is destined to the receiver 20 is transmitted next. The suspension of packet P2 causes a reordering of the packets for transmission, which in turn causes a jump between consecutive sequence numbers.

According to expression (33), the difference D between the sequence numbers for packets P1 and P10 is equal to D=(10−1−1)=8, which differs significantly from count C of the number of packets that could be observed during the interval between these two packets. In this example, even if signal-reception quality is very high, the counting techniques described above would yield a count C=1, which differs significantly with the calculated difference D=8. This example shows that a large difference between the counted number C and the calculated number D of packets does not necessarily indicate signal-reception quality is poor.

4. Suspended Transmissions

The counting techniques described above are intended to count the number of packets that are transmitted successfully within a given interval. Referring to the example shown in FIG. 9, these counting techniques would count the five transmissions of the packet P2 as a successful transmission of one unique packet. It is almost certain that this count is not correct because it is almost certain that the packet P2 was not transmitted successfully. The correct count is almost certainly zero.

This situation can be corrected by recognizing packets that have not been transmitted successfully and excluding them from the count. In one implementation, a packet is deemed not to have been transmitted successfully if all three of the following conditions are satisfied:

(1) several consecutive transmissions of a packet $P_X$ are observed having the same sequence number $Q_X$ and being destined to the same receiver (for implementations that comply with an IEEE 802.11 standard, the technique can check for five consecutive transmissions of the same packet), (2) the next transmitted packet $P_Y$ that is observed has a sequence number $Q_Y$ and is destined to a different receiver, and (3) the difference $J = (Q_Y - Q_X)$ is greater than one.

All three of these conditions are met in the example shown in FIG. 9. Five consecutive transmissions of packet P2 are present that are destined to one receiver, followed by packet P10 that is destined to another receiver. The gap between the sequence numbers for packets P2 and P10 is J=10−2−1=7, which is greater than one. For this example, packet P2 should be excluded from the count.

5. Additional Test for Poor Reception Quality

If the preliminary measure E indicates signal-reception quality may be poor, additional tests can be performed to confirm whether this is true. One test that may be used is to estimate the bit-error rate in received information that is transmitted at different rates.

If the technology used to implement the communication path 11 conforms to the IEEE 802.11a or 802.11g standard, for example, the processing device 10 may adapt its transmissions to send information at rates up to a maximum rate $R_{MAX} = 54$ Mb/sec. Empirical studies have shown that signal-reception quality for the receiver 20 is sufficient to allow the processes described above to be used reliably with packets transmitted at any rate including the maximum rate if packets can be received without any error at a transmission rate $R_0 = 36$ Mb/sec. or if packets can be received without any error that cannot be corrected by an error-correction technique at a transmission rate $R_1 = 48$ Mb/sec.

A source code program fragment is shown below that illustrates schematically one algorithm that can be used to assess whether signal reception quality is high enough to permit the techniques described above to be used reliably with transmissions that occur at the maximum possible rate.

```
[2.1]      F_last_good;            // last good frame
[2.2]      int SNR_change=2;       // SNR change threshold in dB
[2.3]      int BER_max=2;          // maximum allowed bit error rate (percentage)
[2.4]      int time_interval=2     // testing interval in seconds
[2.5]      int receive_quality_good_enough(F_cur) {
[2.6]         if (check_rate(F_cur) == 1)
[2.7]         {
[2.8]            F_last_good = F_cur;
[2.9]            return 1;
[2.10]        }
[2.11]        else if ((F_last_good.SNR - F_cur.SNR) ≦ SNR_change &&
                      (F_cur.TS - F_last_good.TS) < time_interval &&
                      F_cur.BER < BER_max)
[2.12]           return 1;
[2.13]        else
[2.14]           return 0;
[2.15]     }
[2.16]     int R1=48, R0=36;       // transmission rates
[2.17]     int check_rate(F) {
[2.18]        if (F.rate ≧ R0 && F.CRC == 0)
[2.19]           return 1;
[2.20]        else if (F.rate ≧ R1 && F.BER == 0)
[2.21]           return 1;
[2.22]        else
[2.23]           return 0;
[2.24]     }
```

The function receive_quality_good_enough (starting in statement [2.5]) assesses signal-reception quality and returns the value one to indicate the quality is good enough for the estimation techniques described above to be used reliably, and returns the value zero to indicate the quality is not good enough. This assessment begins by invoking a function check_rate (starting in statement [2.17]) to analyze the transmission rates and corresponding error rate of a received frame F. If the function check_rate returns the value one (see statement [2.6]), the pointer F_last_good to the last good frame is updated to point to the current frame (see statement [2.8]) and the value one is returned (see statement [2.9]) indicating signal-reception quality is good.

The check_rate function returns the value one if the information in frame F is received with no errors at a transmission rate that is at least as high as R0 (see statements [2.18] and [2.19]) or if the information in a frame F is received with no uncorrectable errors at a rate that is at least as high as R1 (see statements [2.20] and [2.21]). In this example, the F.CRC=0 indicates the information in frame F was received without error and the element F.BER=0 indicates the information in frame F was received with no uncorrectable error. If neither condition is satisfied, the routine returns the value zero (see statements [2.22] and [2.23]).

If the function check_rate returns the value zero, additional tests are made to determine if the signal-reception quality is still considered good. This is done in statement [2.11] by comparing the received signal-to-noise ratio (SNR), the received time stamp (TS) and the received bit-error rate (BER) of the current frame against the corresponding values for the last good frame. If the amount of change between the values for current frame and the last good frame are all within specified thresholds, an indication is returned in statement [2.12] that signal-reception quality is deemed to be good; otherwise, an indication is returned in statement [2.14] that signal-reception quality is deemed not good.

The rationale for these three comparisons is based on several assumptions. If the SNR for the current frame is within some threshold amount (2 dB in this example) of the SNR for the last good frame, it is likely that current reception conditions are still good enough. This test is limited to frames that are received within some time interval of the last good frame (2 seconds in this example) because changes in receiving conditions such as multi-path fading may raise the SNR that is needed to ensure adequate signal-reception quality. The time interval is kept short enough to reduce the likelihood that conditions have changed significantly since the last good frame. The final test for bit-error rate is used to increase the likelihood that the sequence number in the current frame can be trusted.

The bit-error rate can be estimated by comparing the data in a frame as received with the data in that frame after any bit errors have been corrected by an error correction process, counting the number of bits that were changed by the error correction process, and dividing this number by the total number of bits that were received. If desired, this estimate can be filtered by a low-pass or smoothing filter or used in a calculation of a moving average of the estimated bit-error rate.

This process illustrated in the program fragment above can be used with other communication standards provided their reception characteristics are known for different transmission rates. For a particular protocol, if the transmission rate $R_0$ is known at which the receiver 20 can receive transmissions with no corruption and reception conditions are such that transmissions can be received reliably but not necessarily perfectly at the highest allowed transmission rate $R_{MAX}$, then the algorithms described above can be used with this particular communication protocol by substituting appropriate values for the two rates.

6. Smoothing Filter

The preliminary measure E of reception quality obtained from expression (34) indicates good signal-reception quality if it has a value that is zero or very small. A large value for E may indicate poor signal-reception quality; however, large values may be due to sequence number jumps as described above or they may be due to short-term degradations in receiving conditions such as occasional reductions in SNR, for example. Preferably, short-term conditions should not be allowed to manifest themselves as short-term changes in an overall assessment of signal-reception quality. This can be avoided by using a low-pass or smoothing filter to remove short-term perturbations in the value of E that might otherwise degrade the usefulness of the measure. A source code program fragment is shown below that illustrates schematically one algorithm that can be used to implement a smoothing filter for the measure E.

```
[3.1]   if (abs(E)<3 for last 5 measurements)
[3.2]     return 1;
[3.3]   else if (abs(E)<3 for 14 of last 15 measurements)
[3.4]     return 1;
[3.5]   else if (abs(E)>10 for 2 or more of last 5 measurements)
[3.6]     return 0;
[3.7]   else if (abs(E)>10 for 3 or more of last 10 measurements)
[3.8]     return 0;
[3.9]   else
[3.10]         return 0.5;
```

This filter is a series of IF-ELSE tests that examine a sliding interval of the most recent estimates for E. If all of the most recent estimates are less than 3 (see statement [3.1]), the value one is returned in statement [3.2] indicating signal-reception quality is good. If the conditions for the first IF test are not met, signal-reception quality is deemed to be good by returning a value one in statement [3.4] if 14 of the most recent 15 estimates is less than 3 (see statement [3.3]). If the first two IF tests fail and conditions are met for either of the following two IF tests in statements [3.5] and [3.7], the value zero is returned indicating signal-reception quality is poor. If the conditions for none of the IF tests are met, the value 0.5 is returned in statement [3.10] indicating the signal-reception quality is mediocre.

The conditions specified in the IF tests were derived from empirical data to balance a trade off between the reliability of the indication and the speed at which the indication responds to changing communication conditions. Generally, the value one indicates signal-reception quality is good enough for monitoring purposes.

H. Implementation

The functions required to practice various aspects of the present invention can be performed by components that are implemented in a wide variety of ways including discrete logic components, integrated circuits, one or more ASICs and/or program-controlled processors. The manner in which these components are implemented is not important to the present invention.

Software implementations of the present invention may be conveyed by a variety of machine readable media such as baseband or modulated communication paths throughout the spectrum including from supersonic to ultraviolet frequencies, or storage media that convey information using essentially any recording technology including magnetic tape, cards or disk, optical cards or disc, and detectable markings on media including paper.

The invention claimed is:
1. A method for determining an estimated level of occupancy for a buffer of a processing device in a communication system that comprises:
a data source that sends packets of information;
the processing device that receives the packets of information from the data source, stores information for at least some of the packets in the buffer, and transmits packets of information along a communication channel for reception by one or more receivers;
a receiver that receives packets of information from the communication channel that were transmitted by one or more devices including at least some of the packets of information that were transmitted by the processing device; and
the method comprises:
identifying a selected packet from the packets of information received by the receiver that conveys data indicating the selected packet was received by the receiver as a result of a first attempt by the processing device to transmit the selected packet;
recording a receiving time for the selected packet when it was received by the receiver;
monitoring the communication channel to detect transmissions by any of the one or more devices;
calculating a length of time immediately prior to the receiving time of the selected packet during which no transmissions along the communication channel were detected;
comparing the length of time to a first wait-interval threshold; and
determining the estimated level of occupancy for the buffer to be zero if the length of time exceeds the first wait-interval threshold and generating a signal conveying information that represents the estimated level of occupancy for the buffer.

2. The method according to claim 1 that calculates a clock adjustment value for use in synchronizing a first clock in the receiver with a second clock in the data source when the level of occupancy of the buffer is determined to be zero, the method comprising:
obtaining a sending time from data conveyed by the selected packet that indicates relative to the second clock in the data source when the information conveyed by the selected packet was sent by the data source;
obtaining an estimated processing delay in the processing device that delays transmissions of packets when the level of occupancy for the buffer is zero;
calculating the clock adjustment value by subtracting the sending time of the selected packet and the estimated processing delay from the receiving time of the selected packet, the receiving time indicating relative to the first clock in the receiver when the selected packet was received by the receiver; and
generating a signal that represents the clock adjustment value.

3. The method according to claim 2 that comprises calculating the estimated processing delay if the length of time is equal to a second wait-interval threshold that is smaller than the first wait-interval threshold.

4. The method according to claim 2 that comprises:
calculating a plurality of adjustment values for a plurality of selected packets;
examining the plurality of adjustment values to estimate whether any of the plurality of selected packets encountered a queuing delay in the processing device prior to transmission by the processing device; and
obtaining the clock adjustment value from those adjustment values corresponding to selected packets that are estimated not to have encountered queuing delays.

5. The method according to claim 1 that comprises:
monitoring the communication channel to derive communication traffic statistics, wherein the processing device uses a communication protocol to transmit packets of information along the communication channel;
obtaining estimated individual times required by the processing device to transmit unique packets of information from a model based on the communication traffic statistics, the estimated individual times being sums of wait intervals and transmit intervals where:
  a respective wait interval is an amount of time imposed by the communication protocol that the processing device must wait before transmitting packets of information along the communication channel, and
  a respective transmit time is an amount of time required by the processing device to inject data representing the packet of information into the communication channel;
obtaining a sum of the estimated individual times required by the processing device to transmit each of a number of unique packets of information; and
deriving an estimated rate of transmission of unique packets of information by the processing device from a division of the number of unique packets by the sum of estimated individual times and generating a signal that represents the estimated rate of transmission of unique packets of information by the processing device.

6. An apparatus for determining an estimated level of occupancy for a buffer of a processing device in a communication system that comprises:
  a data source that sends packets of information;
  the processing device that receives the packets of information from the data source, stores information for at least some of the packets in the buffer, and transmits packets of information along a communication channel for reception by one or more receivers;
  a receiver that receives packets of information from the communication channel that were transmitted by one or more devices including at least some of the packets of information that were transmitted by the processing device; and
the apparatus comprises:
  means for identifying a selected packet from the packets of information received by the receiver that conveys data indicating the selected packet was received by the receiver as a result of a first attempt by the processing device to transmit the selected packet;
  means for recording a receiving time for the selected packet when it was received by the receiver;
  means for monitoring the communication channel to detect transmissions by any of the one or more devices;
  means for calculating a length of time immediately prior to the receiving time of the selected packet during which no transmissions along the communication channel were detected;
  means for comparing the length of time to a first wait-interval threshold; and
  means for determining the estimated level of occupancy for the buffer to be zero if the length of time exceeds the first wait-interval threshold and generating a signal conveying information that represents the estimated level of occupancy for the buffer.

7. The apparatus according to claim 6 that calculates a clock adjustment value for use in synchronizing a first clock in the receiver with a second clock in the data source when the level of occupancy of the buffer is determined to be zero, the apparatus comprising:
  means for obtaining a sending time from data conveyed by the selected packet that indicates relative to the second clock in the data source when the information conveyed by the selected packet was sent by the data source;
  means for obtaining an estimated processing delay in the processing device that delays transmissions of packets when the level of occupancy for the buffer is zero;
  means for calculating the clock adjustment value by subtracting the sending time of the selected packet and the estimated processing delay from the receiving time of the selected packet, the receiving time indicating relative to the first clock in the receiver when the selected packet was received by the receiver; and
  means for generating a signal that represents the clock adjustment value.

8. The apparatus according to claim 7 that comprises means for calculating the estimated processing delay if the length of time is equal to a second wait-interval threshold that is smaller than the first wait-interval threshold.

9. The apparatus according to claim 7 that comprises:
  means for calculating a plurality of adjustment values for a plurality of selected packets;
  means for examining the plurality of adjustment values to estimate whether any of the plurality of selected packets encountered a queuing delay in the processing device prior to transmission by the processing device; and
  means for obtaining the clock adjustment value from those adjustment values corresponding to selected packets that are estimated not to have encountered queuing delays.

10. The apparatus according to claim 6 that comprises:
  means for monitoring the communication channel to derive communication traffic statistics, wherein the processing device uses a communication protocol to transmit packets of information along the communication channel;
  means for obtaining estimated individual times required by the processing device to transmit unique packets of information from a model based on the communication traffic statistics, the estimated individual times being sums of wait intervals and transmit intervals where:
    a respective wait interval is an amount of time imposed by the communication protocol that the processing device must wait before transmitting packets of information along the communication channel, and
    a respective transmit time is an amount of time required by the processing device to inject data representing the packet of information into the communication channel;
  means for obtaining a sum of the estimated individual times required by the processing device to transmit each of a number of unique packets of information; and
  means for deriving an estimated rate of transmission of unique packets of information by the processing device from a division of the number of unique packets by the sum of estimated individual times and generating a signal that represents the estimated rate of transmission of unique packets of information by the processing device.

11. A non-transitory storage medium recording a program of instructions that is executable by a device to perform a method for determining an estimated level of occupancy for a buffer of a processing device in a communication system that comprises:
  a data source that sends packets of information;
  the processing device that receives the packets of information from the data source, stores information for at least some of the packets in the buffer, and transmits packets of information along a communication channel for reception by one or more receivers;
  a receiver that receives packets of information from the communication channel that were transmitted by one or more devices including at least some of the packets of information that were transmitted by the processing device; and the method comprises:
- identifying a selected packet from the packets of information received by the receiver that conveys data indicating the selected packet was received by the receiver as a result of a first attempt by the processing device to transmit the selected packet;
- recording a receiving time for the selected packet when it was received by the receiver;
- monitoring the communication channel to detect transmissions by any of the one or more devices;
- calculating a length of time immediately prior to the receiving time of the selected packet during which no transmissions along the communication channel were detected;
- comparing the length of time to a first wait-interval threshold; and
- determining the estimated level of occupancy for the buffer to be zero if the length of time exceeds the first wait-interval threshold and generating a signal conveying information that represents the estimated level of occupancy for the buffer.

* * * * *